United States Patent
Buechler

(10) Patent No.: US 7,542,381 B2
(45) Date of Patent: Jun. 2, 2009

(54) METHOD AND DEVICE FOR TRACK COUNTING IN OPTICAL RECORDING MEDIA

(75) Inventor: Christian Buechler, VS-Marbach (DE)

(73) Assignee: Thomson Licensing, Boulogne-Billancourt (FR)

( * ) Notice: Subject to any disclaimer, the term of this patent is extended or adjusted under 35 U.S.C. 154(b) by 334 days.

(21) Appl. No.: 11/587,326

(22) PCT Filed: Apr. 16, 2005

(86) PCT No.: PCT/EP2005/004064

§ 371 (c)(1),
(2), (4) Date: Oct. 19, 2006

(87) PCT Pub. No.: WO2005/104107

PCT Pub. Date: Nov. 3, 2005

(65) Prior Publication Data

US 2007/0253293 A1    Nov. 1, 2007

(30) Foreign Application Priority Data

Apr. 20, 2004   (DE) ........................ 10 2004 019 692

(51) Int. Cl.
*G11B 7/085* (2006.01)
(52) U.S. Cl. .............................. 369/30.13; 369/44.26
(58) Field of Classification Search ............... 369/30.13, 369/30.14, 44.26, 44.28, 44.35, 44.41, 44.27, 369/44.34; G09B 7/005, 7/009, 7/047, 7/056, G09B 11/038, 20/01, 21/018
See application file for complete search history.

(56) References Cited

U.S. PATENT DOCUMENTS

| | | | |
|---|---|---|---|
| 5,034,940 A | | 7/1991 | Saito et al. |
| 5,920,539 A | * | 7/1999 | Schell et al. ................. 720/658 |
| 5,956,304 A | * | 9/1999 | Supino et al. ............ 369/44.34 |
| 6,157,599 A | | 12/2000 | Yamashita et al. |
| 6,473,369 B1 | | 10/2002 | Quan et al. |
| 2003/0053385 A1 | | 3/2003 | Tobita et al. |

FOREIGN PATENT DOCUMENTS

| | | |
|---|---|---|
| DE | 19807272 A1 | 3/1999 |
| EP | 1073044 | 1/2001 |
| EP | 1089267 A1 | 4/2001 |
| EP | 1199716 | 4/2002 |
| WO | WO 02/17310 | 2/2002 |
| WO | WO 02/49022 | 6/2002 |

OTHER PUBLICATIONS

Search Report Dated Sep. 7, 2005.

* cited by examiner

*Primary Examiner*—Ali Neyzari
(74) *Attorney, Agent, or Firm*—Robert D. Shedd; Robert B. Levy; Jorge Tony Villabon

(57) ABSTRACT

The invention relates to the identification of the direction of the relative movement between a scanning beam of an optical scanner and the tracks of optical storage media. Use is made of the fact that the amplitude of the component TW of a track error signal TE, said component being brought about by wobble of the tracks, is maximal in the track center and minimal in the region between the tracks. A signal TW is thus present which does not assume its maxima and minima across the scanning location x at the same places as the track error signal TE. The invention describes devices and methods for determining the movement direction DIR of the scanning beam from the phase shift between the two signals.

11 Claims, 21 Drawing Sheets

METHOD AND DEVICE FOR TRACK COUNTING IN OPTICAL RECORDING MEDIA

This application claims the benefit, under 35 U.S.C. § 365 of International Application PCT/EP05/004064, filed Apr. 16, 2005, which was published in accordance with PCT Article 21(2) on Nov. 3, 2005 in English and which claims the benefit of Germany patent application No. 102004019692.3, filed Apr. 20, 2004.

The invention relates to the control of devices for accessing optical storage media, specifically the identification of the direction of the relative movement between a scanning beam of an optical scanner and the tracks of an optical storage medium.

On prerecorded optical storage media, so-called ROM media such as CD-ROM, DVD-ROM or the future successors thereof, or on already prerecorded media, so-called R/RW media such as CD-R/RW, DVD+R/RW or successors, the direction of the relative movement between the spot of the scanning beam and the tracks of the medium can be detected by evaluation of a track error signal and also the envelopes of a data signal. For this purpose, a track zero crossing signal and also a mirror zero cross signal are formed by comparators. In accordance with FIG. 6, the track zero crossing signal TZC is generated by comparing the track error signal TE with zero. The track error signal TE itself can be formed in various ways, such as, by way of example, by means of the so-called push-pull method, the differential push-pull method or the three-beam method. The track zero crossing signal TZC exhibits a change or an edge whenever the center of the information track of the data carrier, also called groove, or the center of the region between two tracks, also called the land, is reached.

The methods of the prior art often relate to the fact that there is a difference in contrast between groove and land. Moreover, many of the previously known solutions are based on the fact that either the optical storage medium is already prerecorded or the scanning system works with three scanning beams.

A method for forming the mirror zero cross signal MZC makes use of the fact that the modulation of the data signal by the information-carrying depressions—also referred to as pits—is greatest on track centers and the lower envelope of the data signal exhibits a low value there in accordance with a low reflection factor. In the center between two tracks, on the other hand, the modulation by the pits is small and the lower envelope has a higher value there in accordance with a higher reflection factor. In accordance with FIGS. 6 and 18, in order to detect this, the lower envelope HFE is formed by peak value detection from the DC-coupled data signal HF formed from the sum of all the photodetector signals. The envelope signal HFE is fed to a comparator 2103 either directly or after passing through a low-pass filter, which comparator compares said signal with a threshold value VC and generates the binary mirror zero cross signal MZC therefrom. The signal diagram of FIG. 6 shows the signals TE, HF, HFE, TZC and MZC and also the associated states of the state logic 2102—shown in FIG. 18—as functions of time assuming uniform crossing of the tracks.

The mirror zero cross signal MZC can also be formed by means of a low-pass filter and a comparator. For this purpose, the summation signal of selected detectors is low-pass-filtered in order to suppress the high-frequency signal components of the stored information and to obtain a signal, the so-called mirror signal MIR, which is proportional to the average reflectivity. In the case of the types of optical storage media mentioned, the average reflectivity differs between the written-to groove tracks and the land regions in between. A comparator then compares the mirror signal MIR with a threshold value and thus generates a mirror zero cross signal.

Depending on the movement direction of the scanning being relative to the tracks of the storage medium, there is a phase shift of +90° or −90° between the track zero crossing signal and the mirror zero cross signal, which corresponds to one quarter of the track width. FIGS. 6 and 7 reveal the direction in which the scanning beam or the spot moves in relation to the surface of the optical storage medium. FIG. 7 shows the state diagram of the state logic 2102 which is shown in FIG. 18 and by means of which the movement direction of the scanning beam can be determined from the signals TZC and MZC. Proceeding from an arbitrarily assumed initial state C3, defined by the signal values TZC=0 and MZC=1, there follows either the state C1 given TZC=0 and MZC=0 or the state C2 given TZC=1 and MZC=1. The transition to C1 or to C2 indicates unambiguously the direction in which the scanning beam is moving relative to the tracks.

FIG. 18 also shows, as a further possible variant, that the signals TZC and MZC can also be conditioned by a D-type flip-flop 2104 in such a way that the crossed tracks can be counted in a direction-dependent manner by means of an up-down counter 2101.

In order to be able to generate a mirror zero cross signal as described above, a data signal HF must necessarily be present, which is afforded as standard in the case of prewritten-to ROM media. Many of the previously known solutions for error-free track counting are thus based on the fact that the optical storage medium must already be prerecorded. In the case of write once or write many optical storage media of the "−R" or "−RW" type, however, there may be regions which have not been written to and whose scanning gives rise neither to a data signal nor to a reflection that differs between groove and land. The above-described method for generating the mirror zero cross signal, and thus a determination of direction based on this method, cannot be employed, therefore, in regions that have not been written to.

Methods based on a use of scanning systems having more than one scanning beam have been proposed for the determination of direction in regions that have not been written to.

The invention is based on the object of enabling a direction-dependent track counting such that, on the one hand, only one scanning beam is required for this purpose and, on the other hand, the movement direction of the scanning beam relative to the tracks of the medium can be detected even in regions of optical storage media that have not been written to.

According to the invention, a wobble signal is determined, which describes that component of the track error signal which is brought about by the wobble of the tracks. Use is made of the fact that the amplitude of said wobble signal is maximal in the track center and minimal in the region between two tracks. A signal is thus present which—similarly to the MZC signal of the previously known methods—does not assume its maxima and minima above the scanning location at the same places as the track error signal. The resulting phase shift of the wobble signal relative to the track error signal then indicates the movement direction of the scanning beam relative to the tracks. For this purpose, it is possible to generate either a signal corresponding to the mirror zero cross signal, or else a direction signal indicating the movement direction of a scanning beam relative to the tracks scanned by it. A prerequisite for the application of the invention is that the tracks of the optical storage medium are wobbled with respect to their imaginary center.

According to the invention, for driving a track counting device in a scanning unit for optical recording media, a wobble signal is determined from the difference between a lower and an upper envelope of a track error signal that has been high-pass-filtered with a first cutoff frequency; a track zero crossing signal is determined from a track error signal that has been low-pass-filtered with a second cutoff frequency; the wobble signal and the track zero crossing signal are jointly evaluated to ascertain whether, in the event of the sign changes of one of these two signals, the respective other signal has positive or negative values; and drive signals that are used to drive a sequential logic—also referred to as "finite state machine" or "finite automaton"—for track counting are determined from the result of the joint evaluation.

A device according to the invention for determining drive signals for driving a track counting device comprises a high-pass filter with a first cutoff frequency, at the input of which the track error signal is present, and the output signal of which is fed in parallel to two envelope rectifiers for the upper and lower envelopes; a difference forming unit, to which the output signals of the upper and lower envelope rectifiers are fed; a low-pass filter with a second cutoff frequency, at the input of which the track error signal is present; and also an evaluation unit, the input signals of which are formed from the output signals of the difference forming unit and the low-pass filter, and which continuously evaluates whether, in the event of the sign changes of one of its input signals, the respective other of its input signals has positive or negative values, and provides the drive signals therefrom.

The arrangements and methods according to the invention make it possible to identify, on optical storage media with wobbled tracks, in the event of track jumps, the instantaneous direction of the track jump and the type of track just crossed, groove or land. Such a direction-dependent track counting with groove/land identification is advantageous for reliable track jumping and also reliable closing of the track control loop at the end of track jumps.

Since only a single scanning beam is evaluated according to the invention, the advantage is afforded that a track counting realized by means of the invention is not dependent on different track widths or track spacings and therefore does not have to be adapted to these either. Scanners having only one scanning beam also have the advantage of a simple and light mechanical construction. Developments of the invention advantageously enable a reliable generation of a direction signal or a reliable identification of direction even in the cases where the wobble signal has an offset, disturbances or amplitude variations. They are described in the description and also in the dependent patent claims.

A joint evaluation of the wobble signal and the track zero crossing signal with a sample and hold of the product of these two signals has the advantage that momentary disturbances of the drive signals are suppressed.

A joint evaluation with a temporal integration has the advantage that instantaneous disturbances that may be superposed on the wobble signal and influence the envelope thereof are averaged out.

If a clock signal and a direction signal are determined as drive signals, this has the advantage that an up-down counter can be driven directly with these signals.

If a first signal, which changes its value precisely when the scanning beam crosses the center of a track, and a second signal, which changes its value precisely when the scanning beam crosses the boundary between two adjacent tracks, are determined as drive signals, this has the advantage that the evaluation logic of previously known track counting methods can be adopted.

If the evaluation means contain product forming means, the input signals of which are formed from the output signals of the difference forming means and the low-pass filter means, and sample and hold means, to which the output signal of the product forming means is fed, this has the advantage that momentary disturbances of the drive signals are suppressed.

If the low-pass filter means contain phase shift means, and the evaluation means contain product forming means, to which the output signals of the difference forming means and the low-pass filter means are fed, and integration means, to which the output signal of the product forming means is fed, it is advantageously possible to determine the relative phase angle of the two input signals of the product forming means by simply examining the polarity of the output signal of the integration means.

In one development of the invention, provision is made of data signal forming means, HF detection means and changeover means controlled by the output signal of the HF detection means, the signal forming means form a data signal from the sum of the signals of the photodetectors, the HF detection means detect whether a usable data signal corresponding to a written-to region of the recording medium is present, and the changeover means, when a usable data signal is present, change over the input of the high-pass filter means to the data signal. This has the advantage that the same functional units can be used for track counting on written-to and nonwritten-to parts of the recording media, which keeps down the hardware outlay and the current consumption.

If the envelope rectifying means for the upper envelope are deactivated when a usable data signal is present, this has the advantage of a lower current consumption.

If the determination of the track zero crossing signal contains a high-pass filtering for suppressing very low frequency components, this has the advantage of suppressing disturbing DC offsets in the track error signal.

Exemplary embodiments of the invention are illustrated in the drawings and are described in more detail below.

Figure 1:
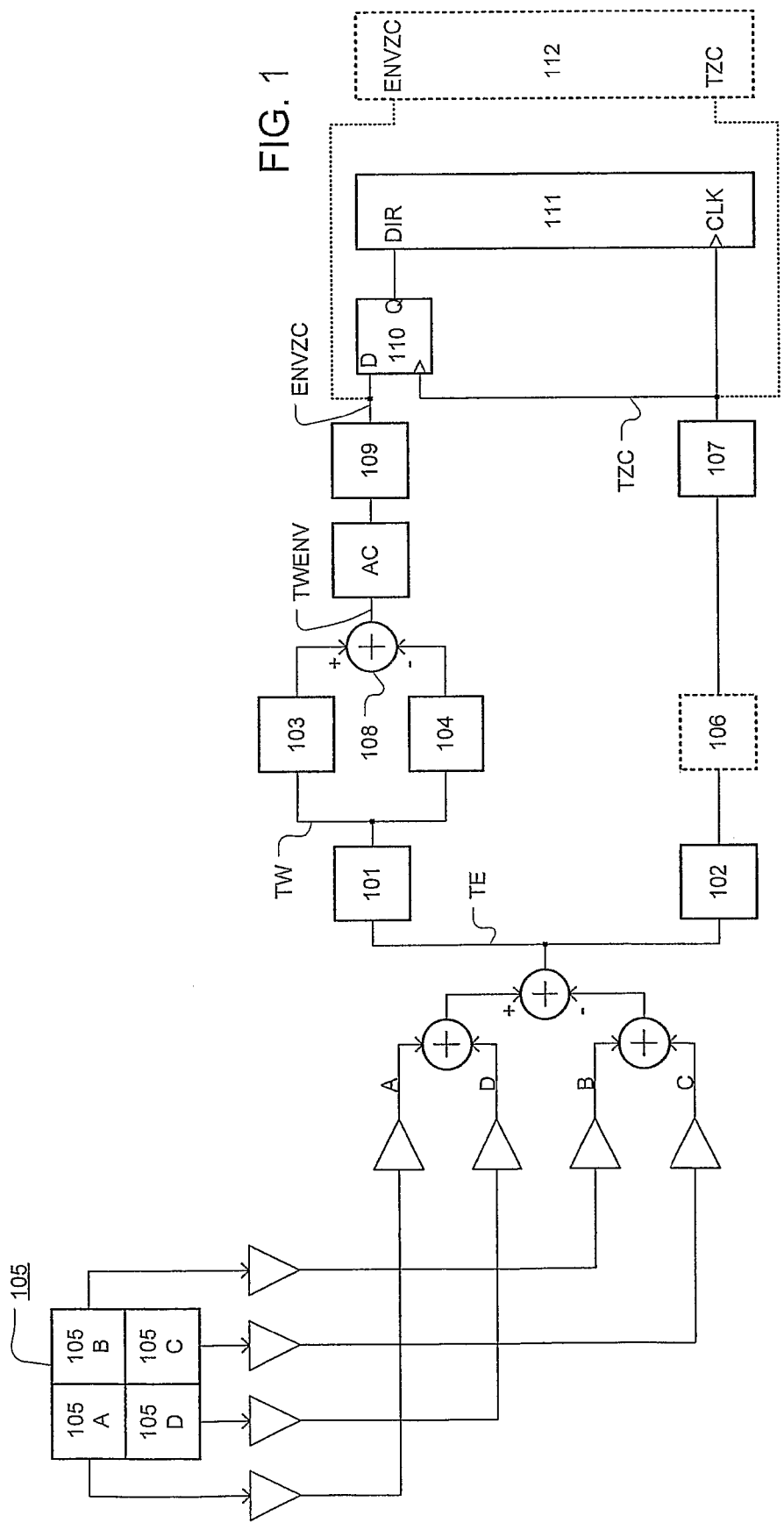
FIG. 1 shows the block diagram of a first exemplary embodiment.
Figure 2:
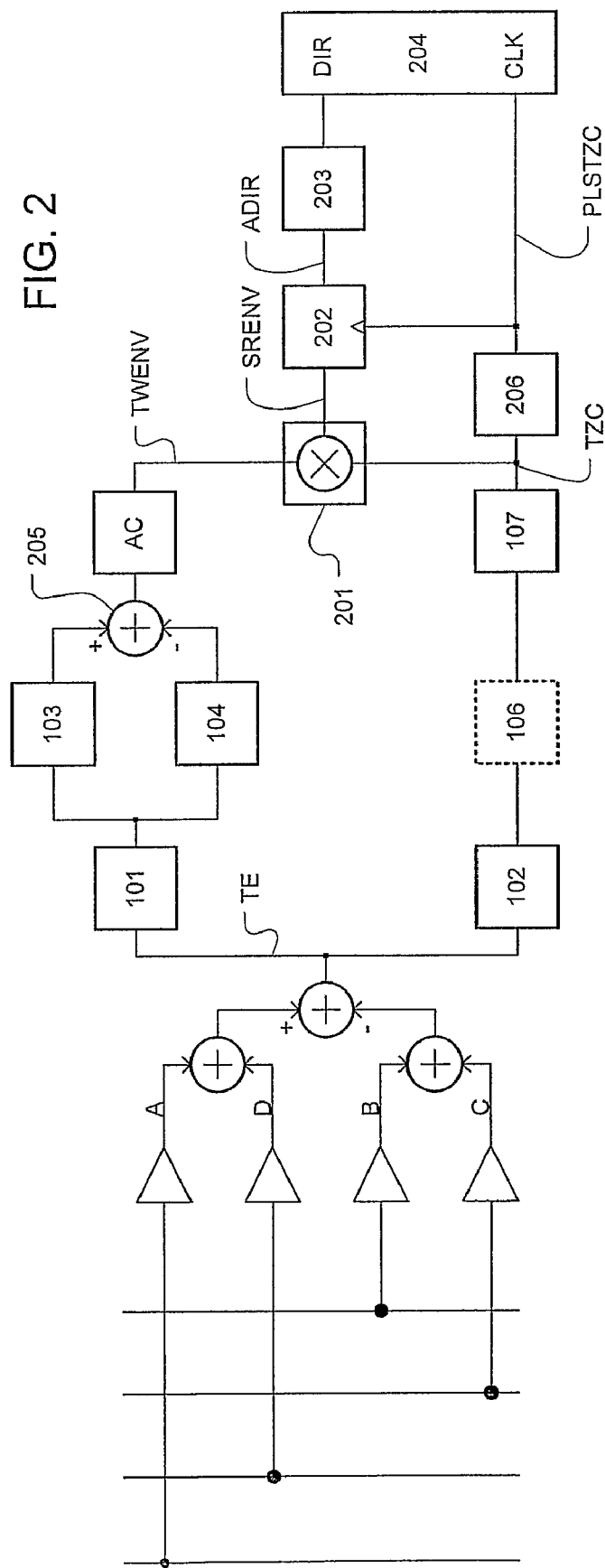
FIG. 2 shows the block diagram of a second exemplary embodiment.
Figure 3A:
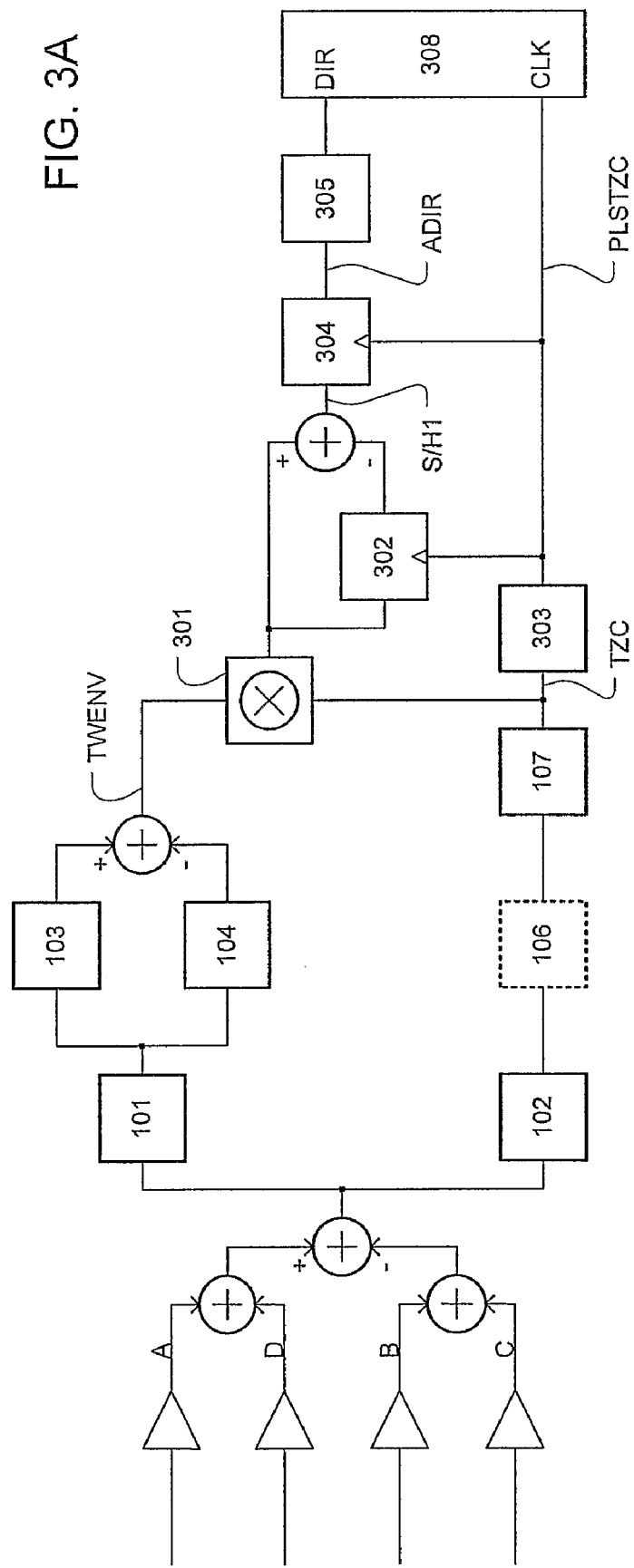
FIG. 3A shows the block diagram of a third exemplary embodiment.
Figure 3B:
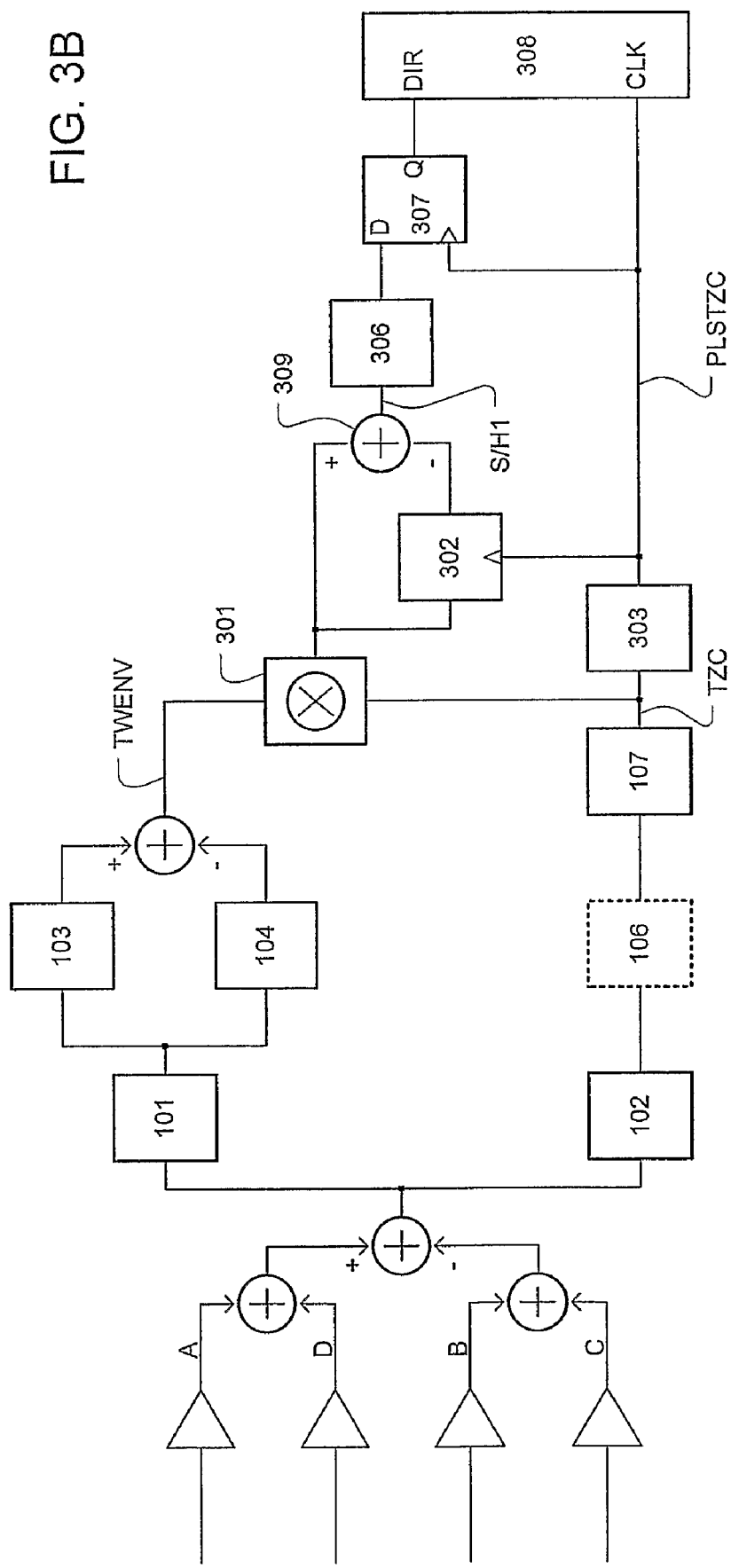
Figure 4A:
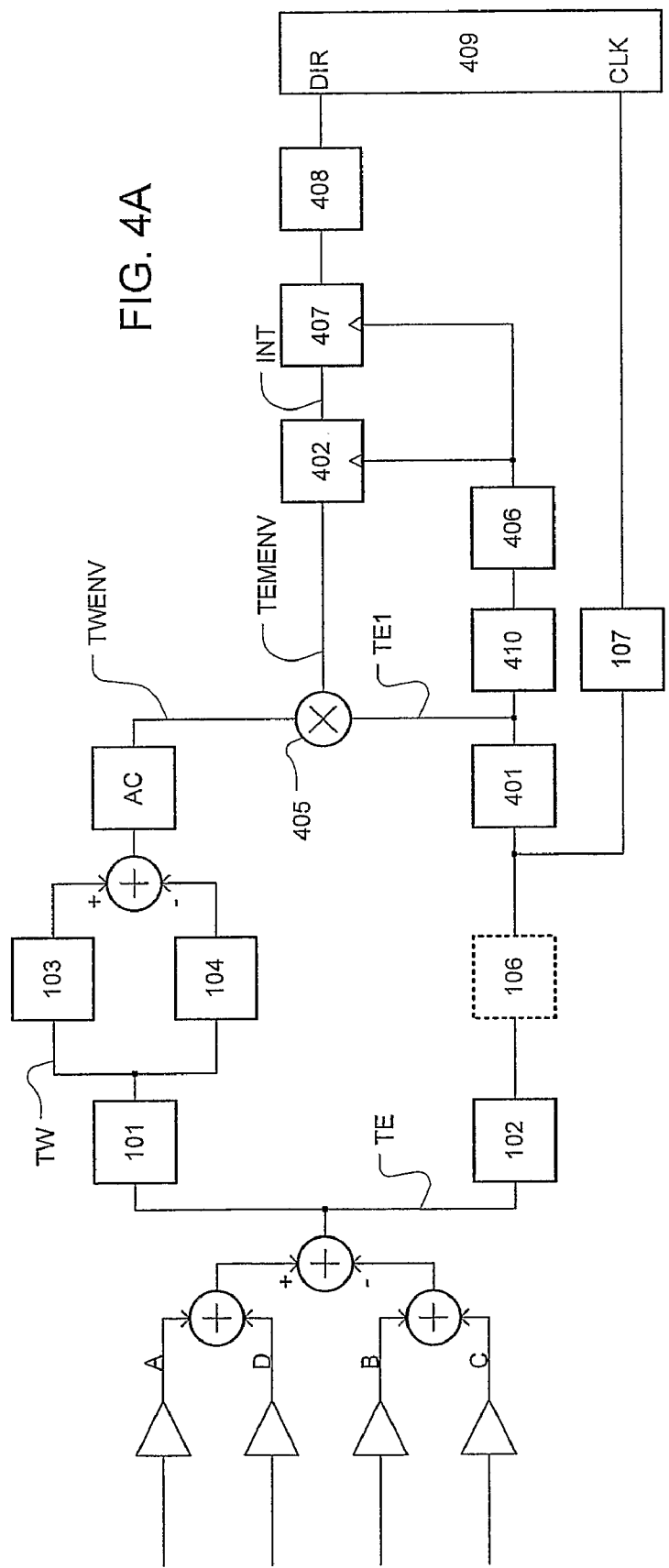
Figure 4B:
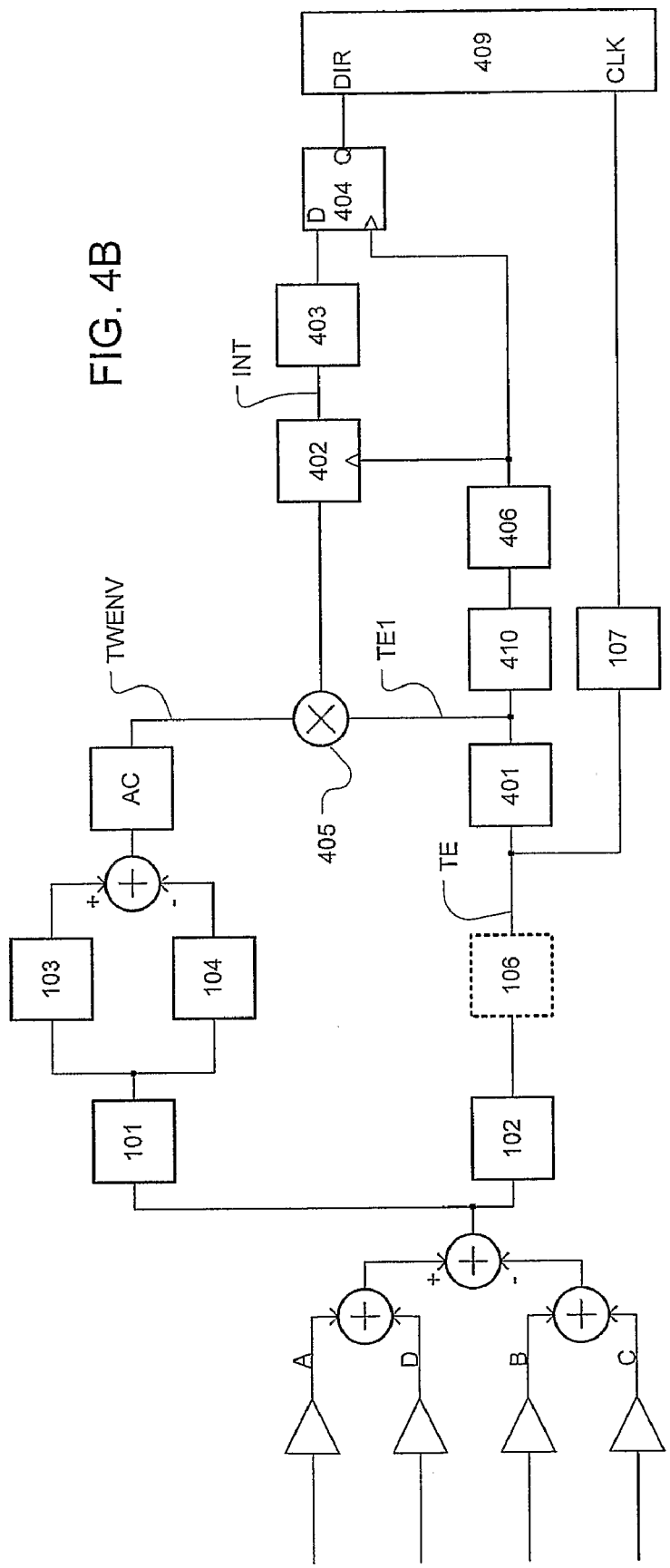
Figure 5A:
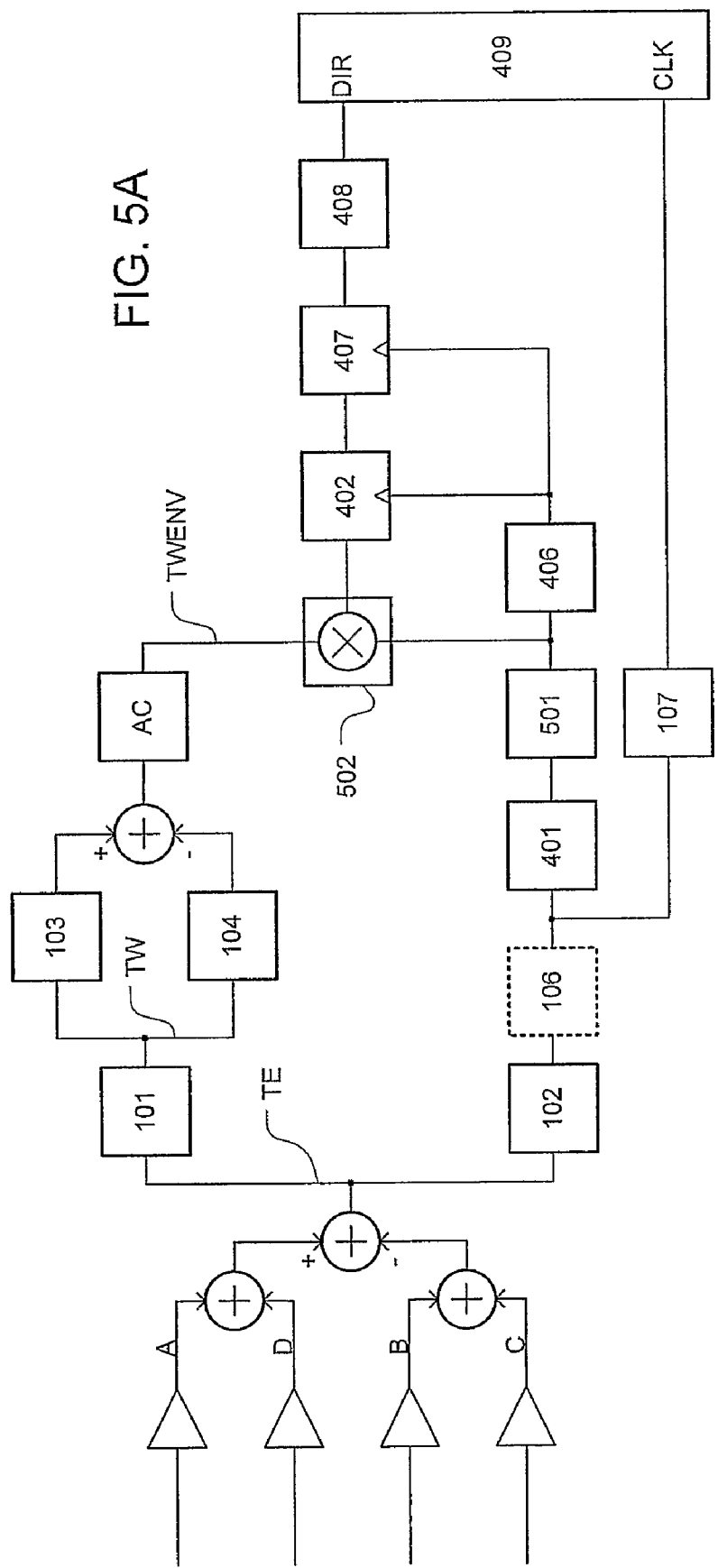
Figure 5B:
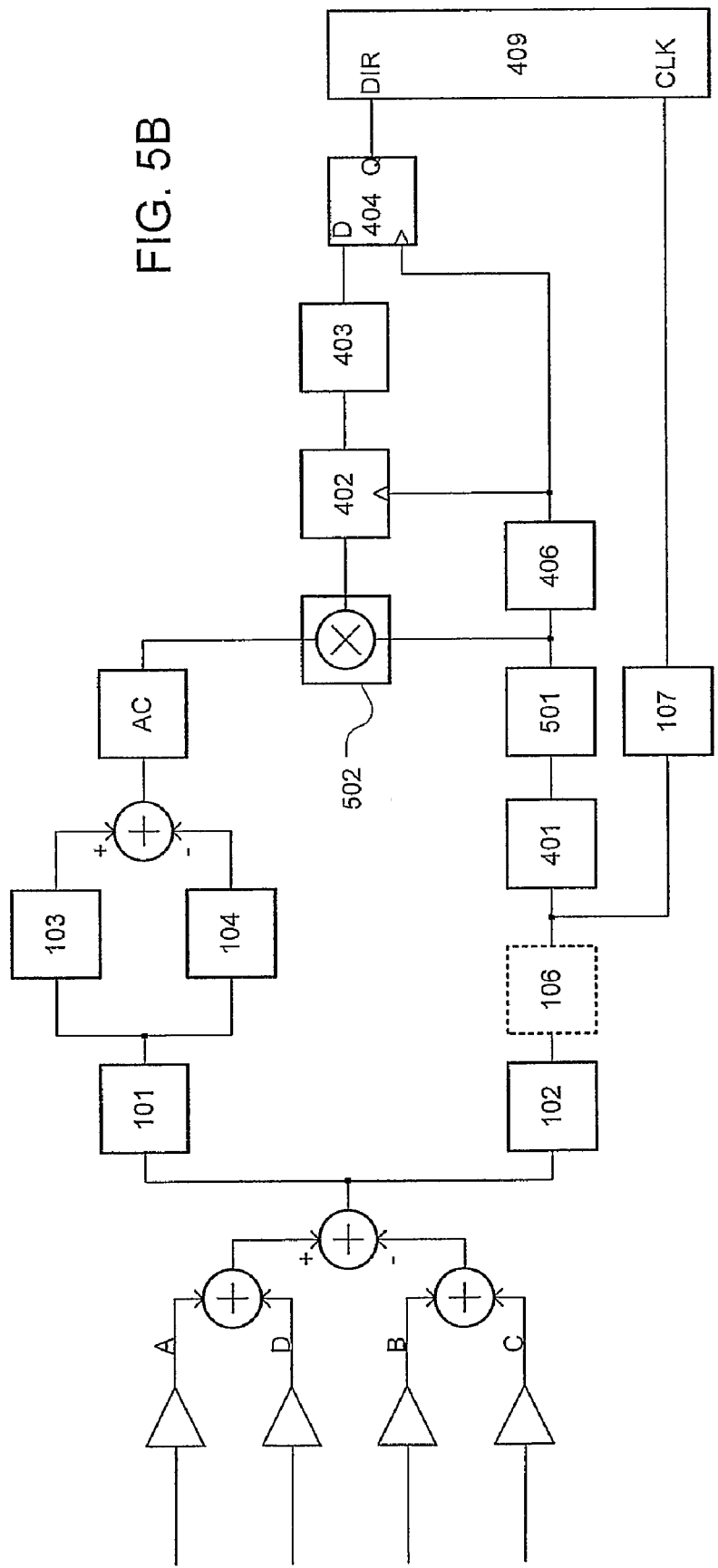
Figure 6:
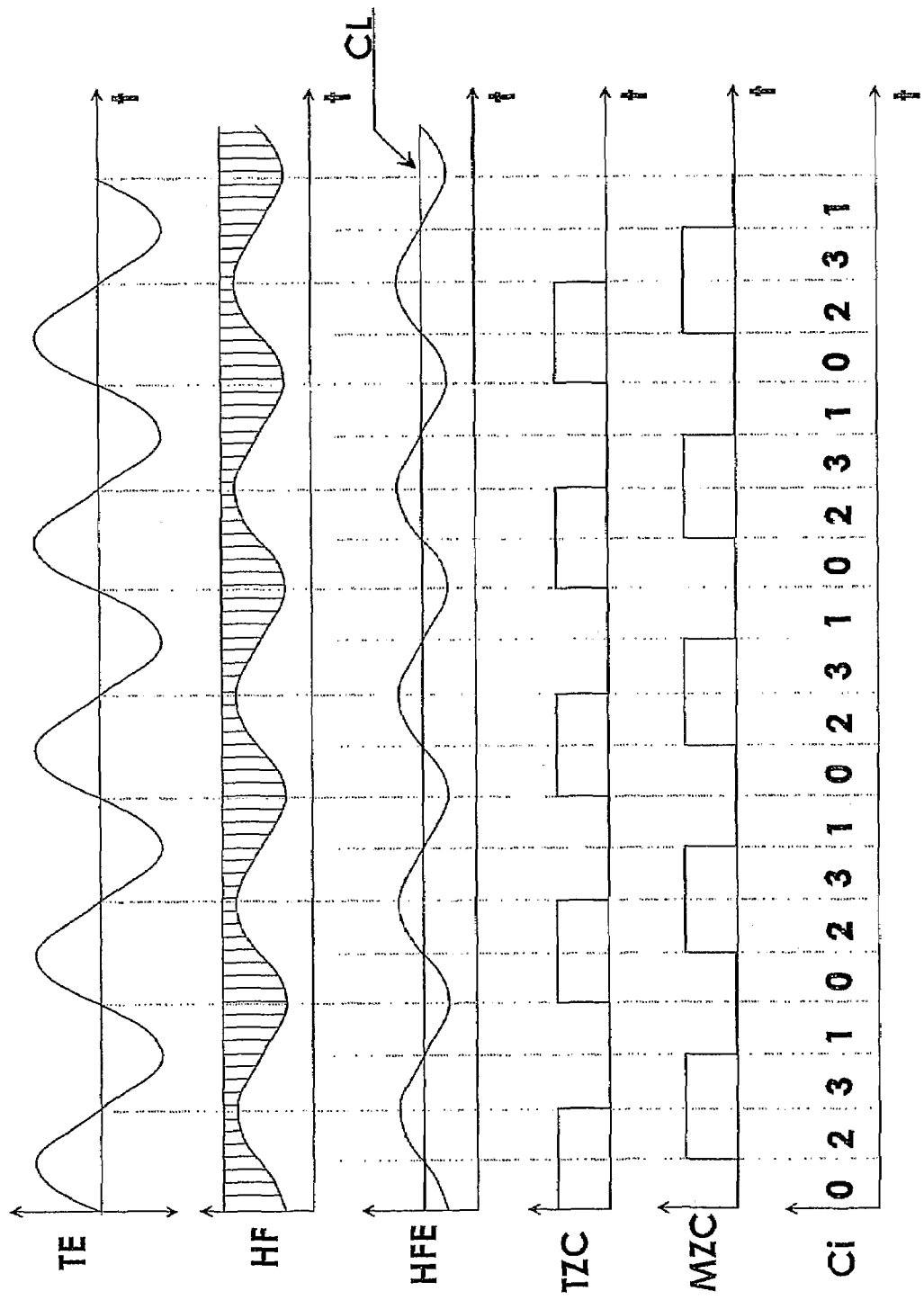
Figure 7:
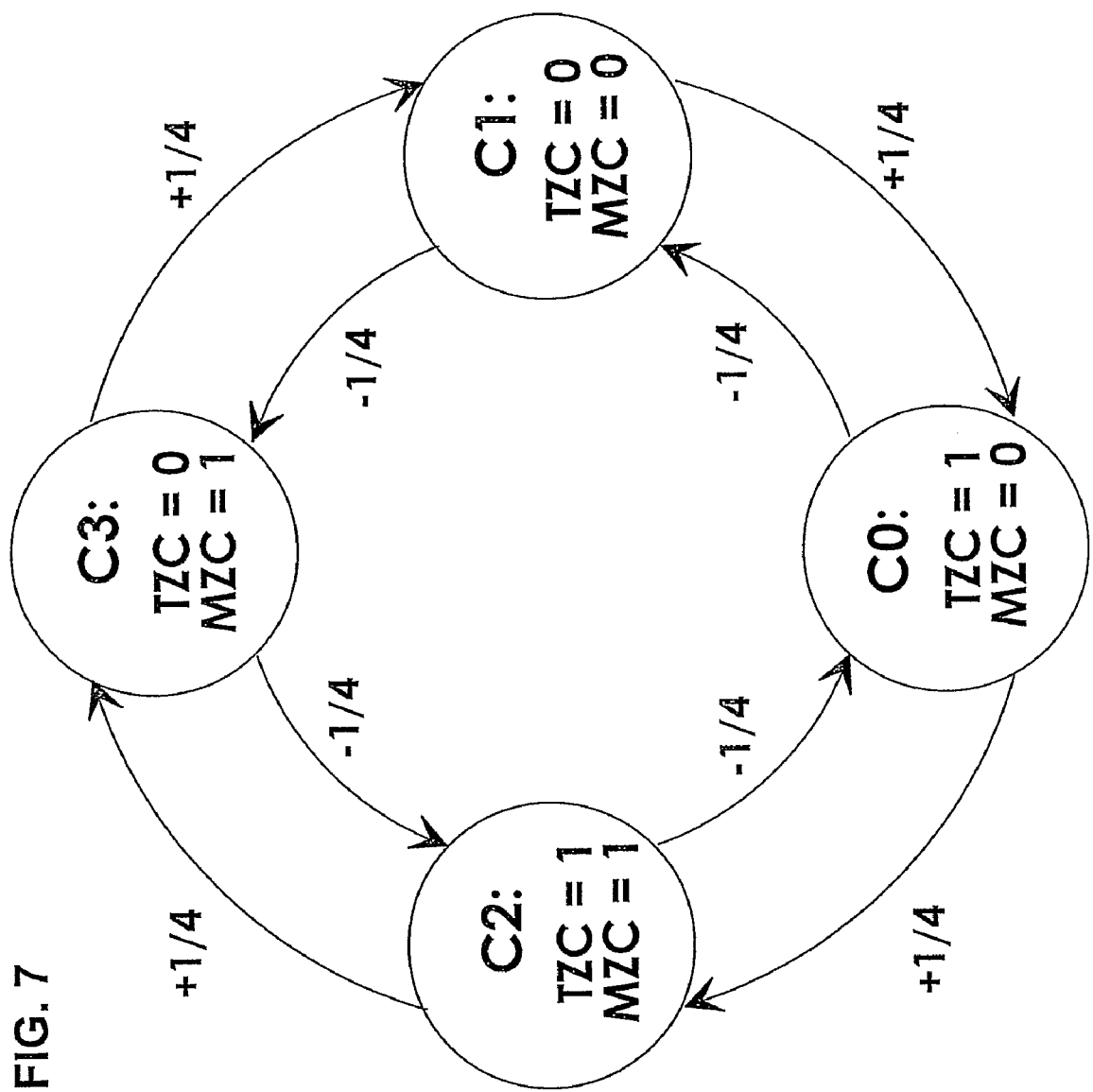
Figure 8:
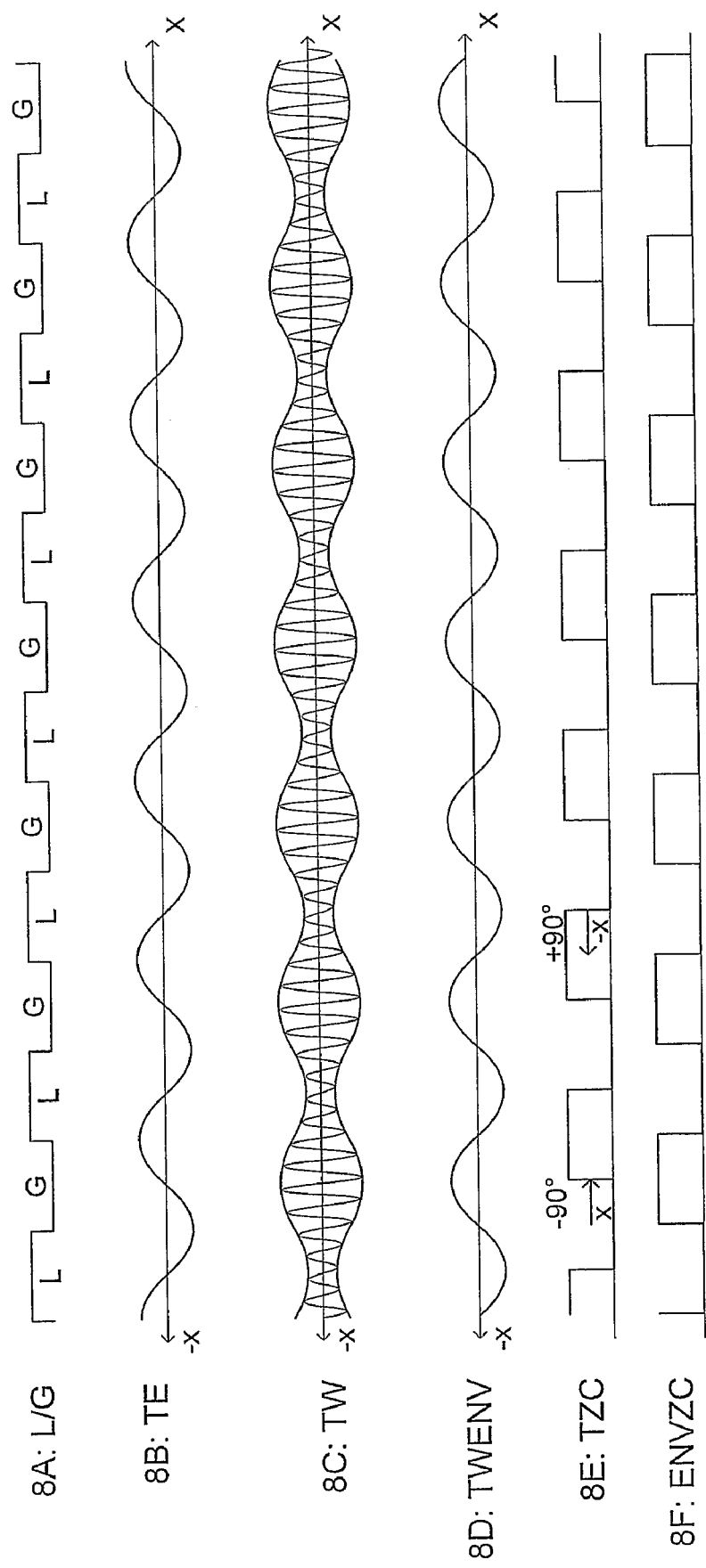
Figure 9:
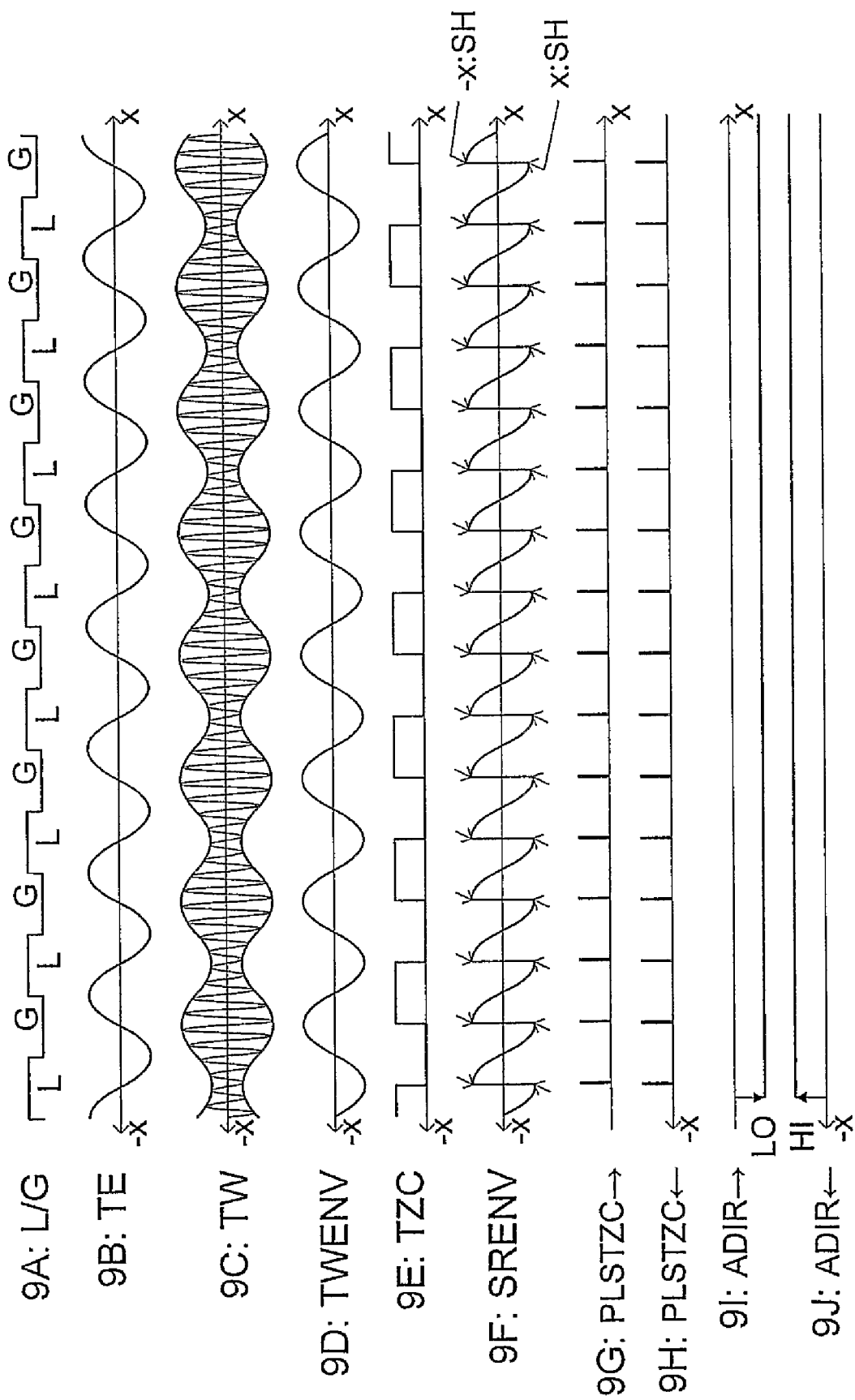
Figure 10:
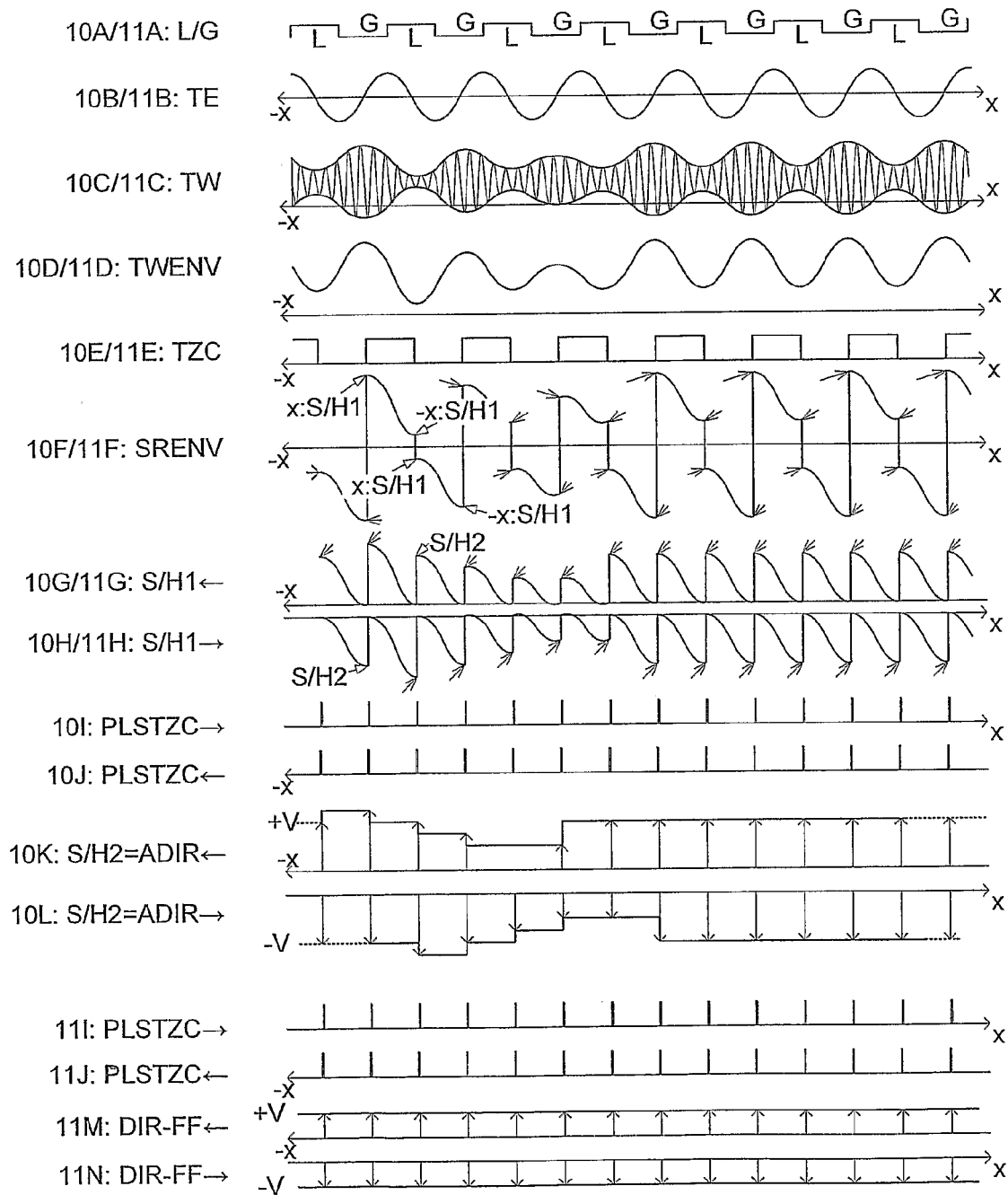
Figure 11:
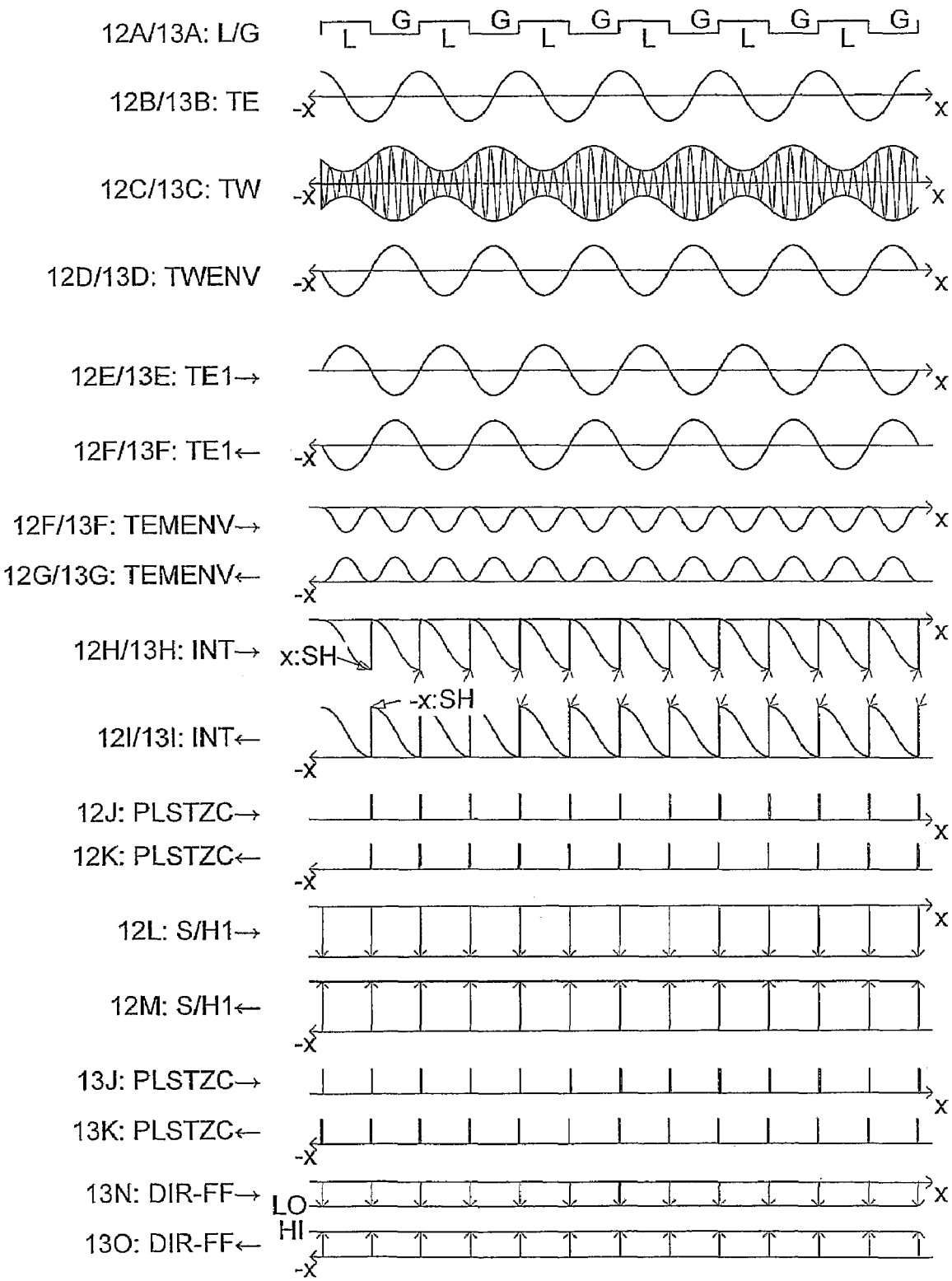
Figure 12:
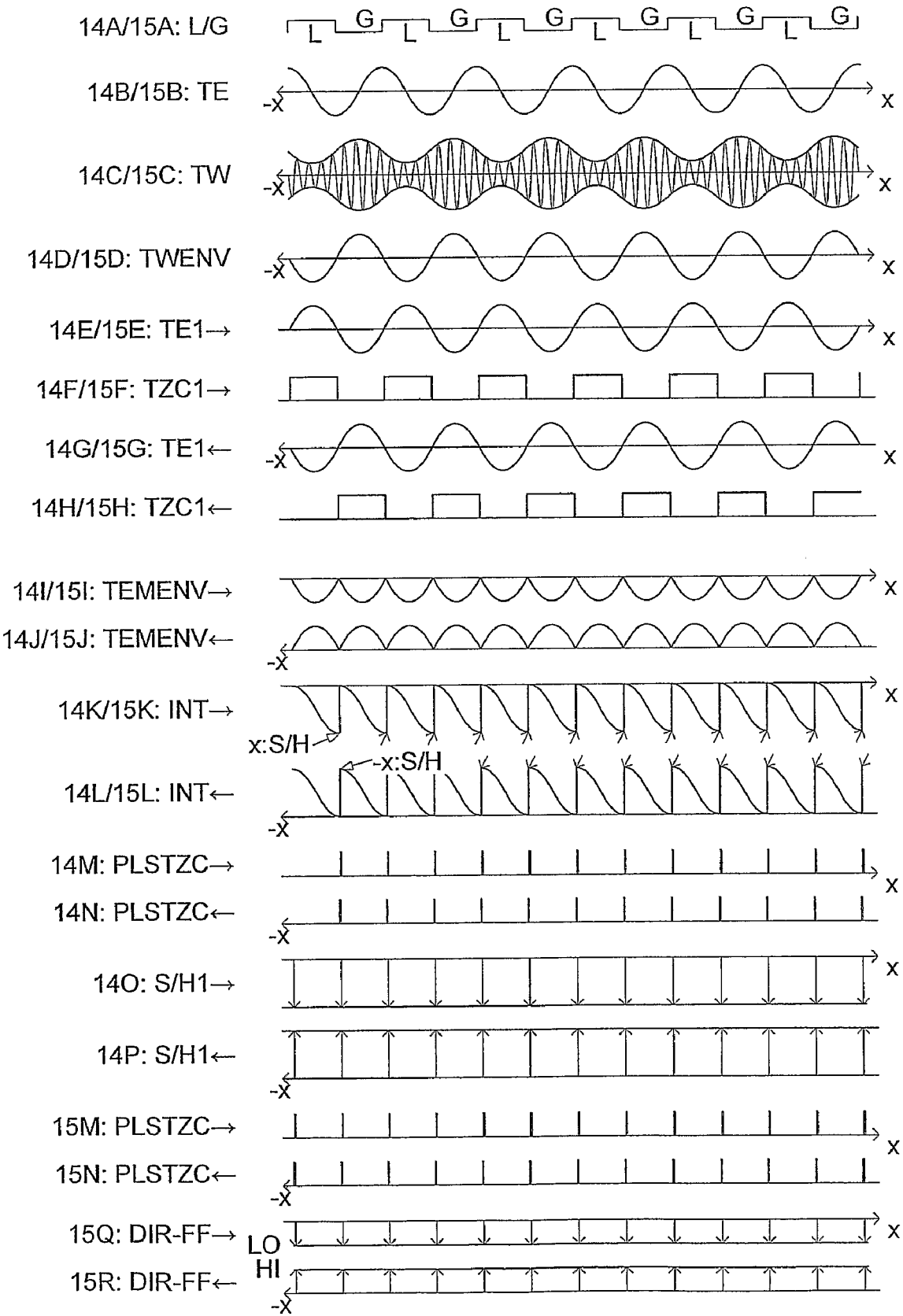
Figure 13:
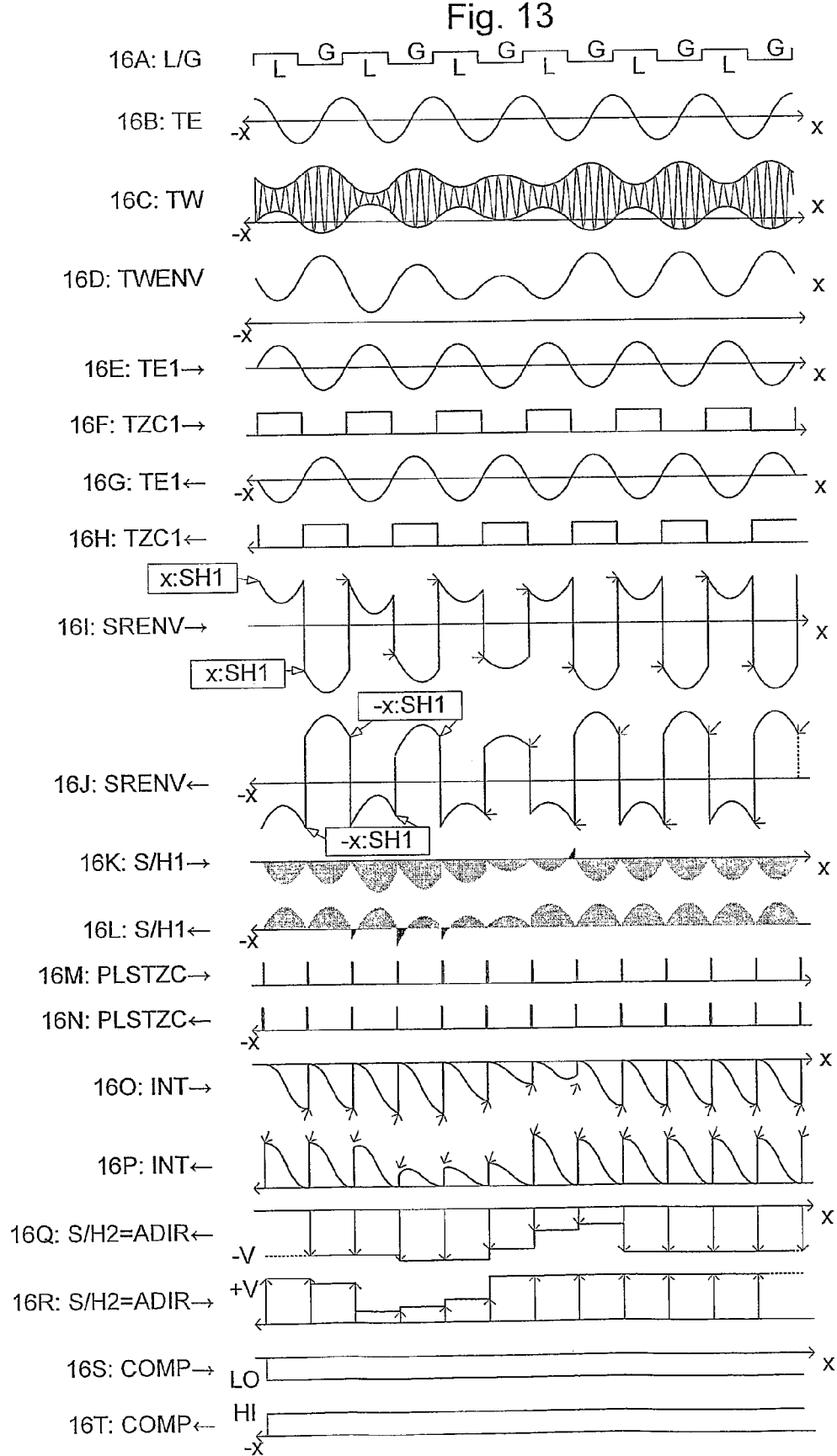
Figure 14:
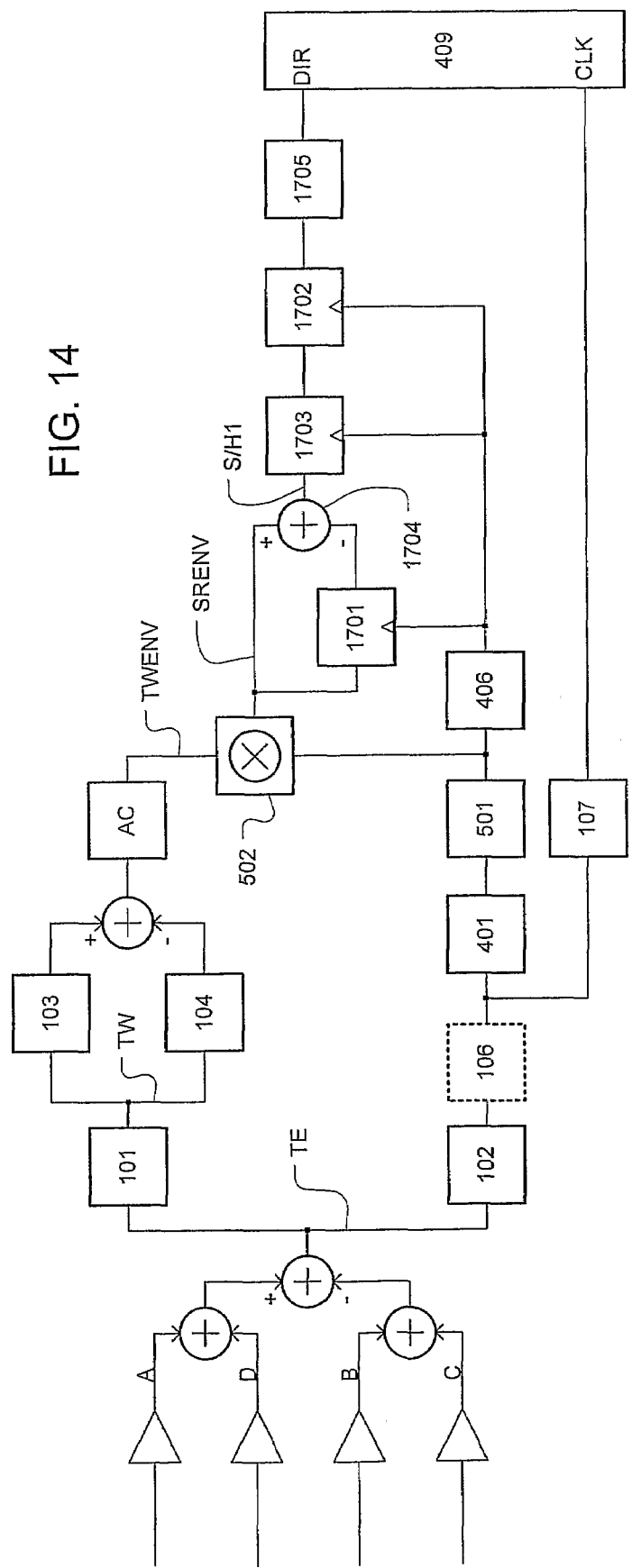
Figure 15:
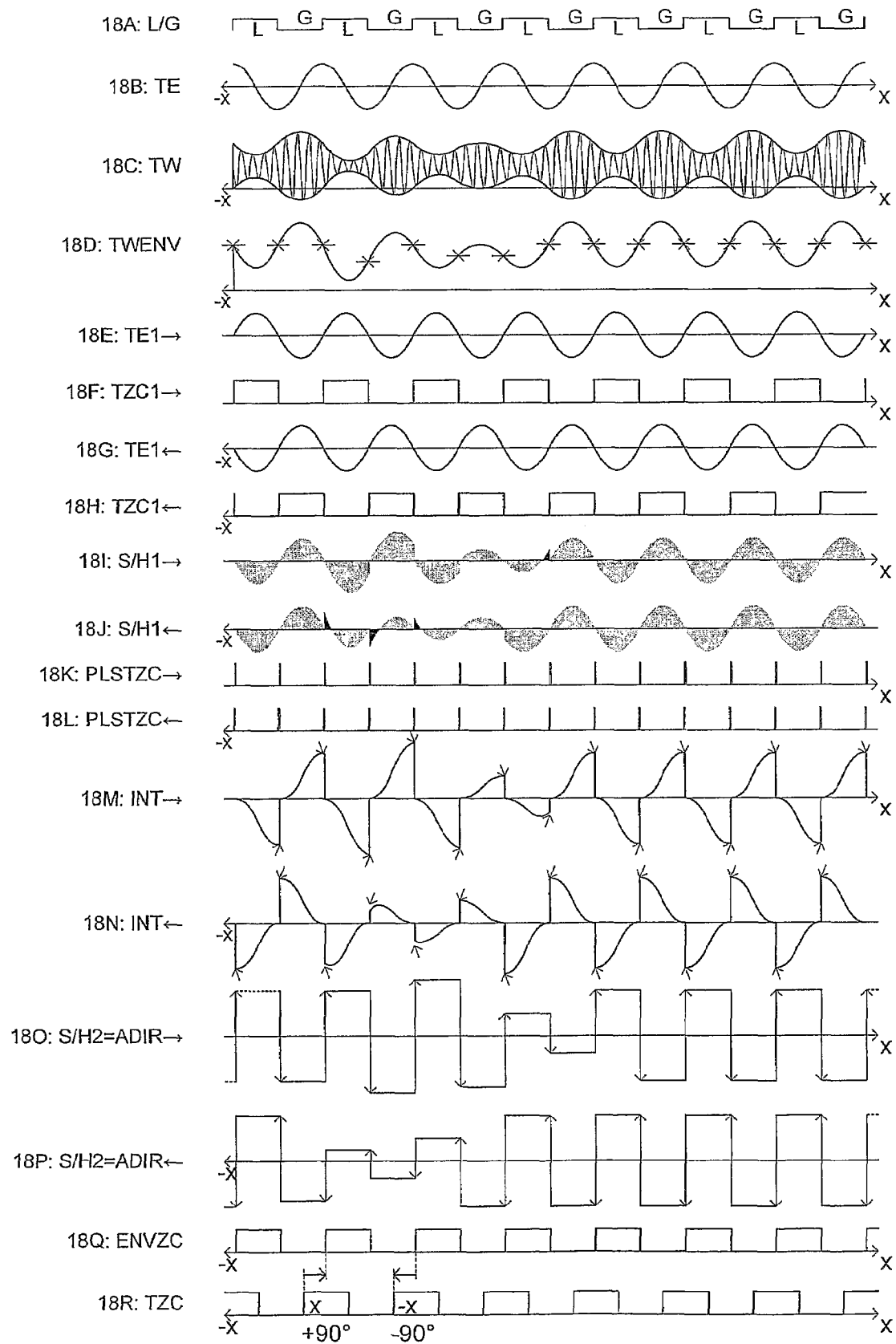
Figure 16:
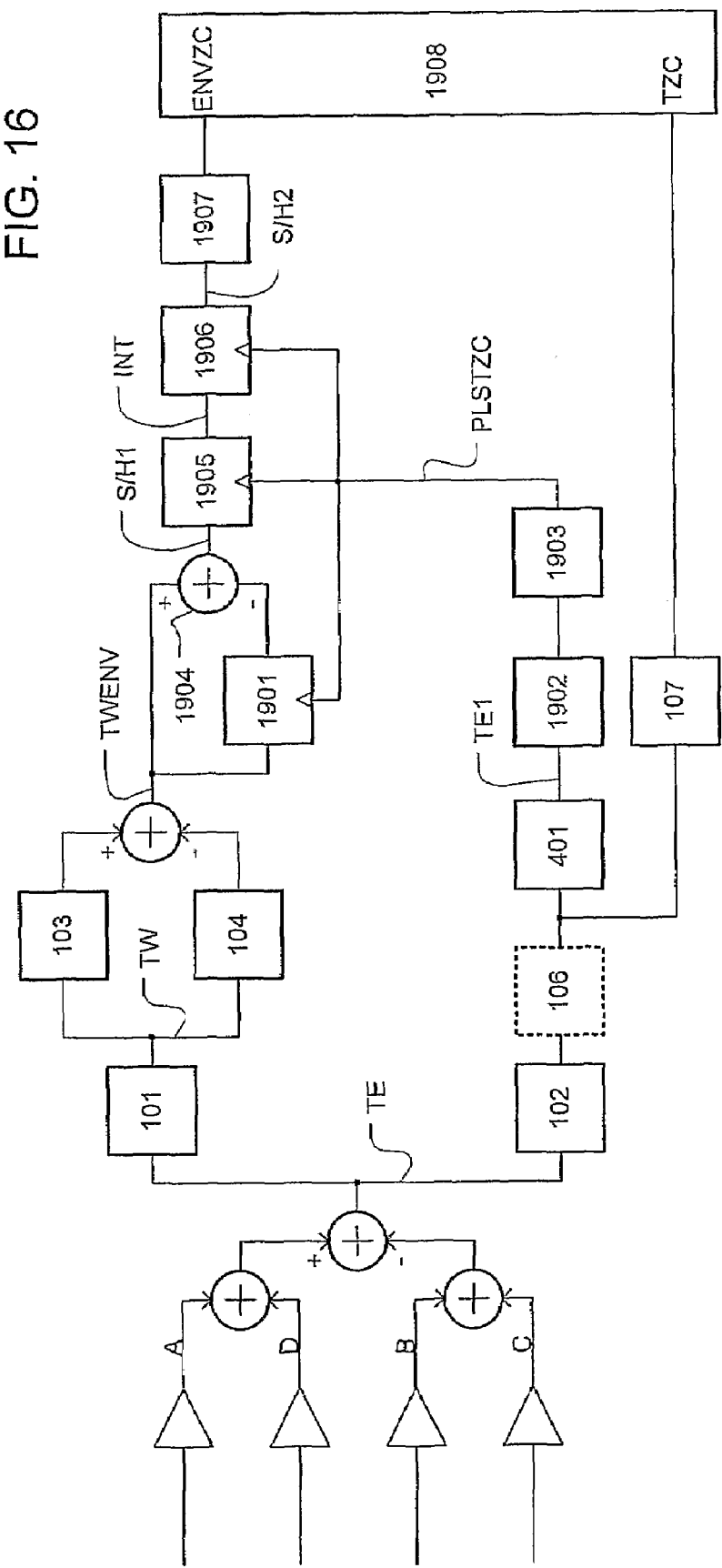
Figure 17:
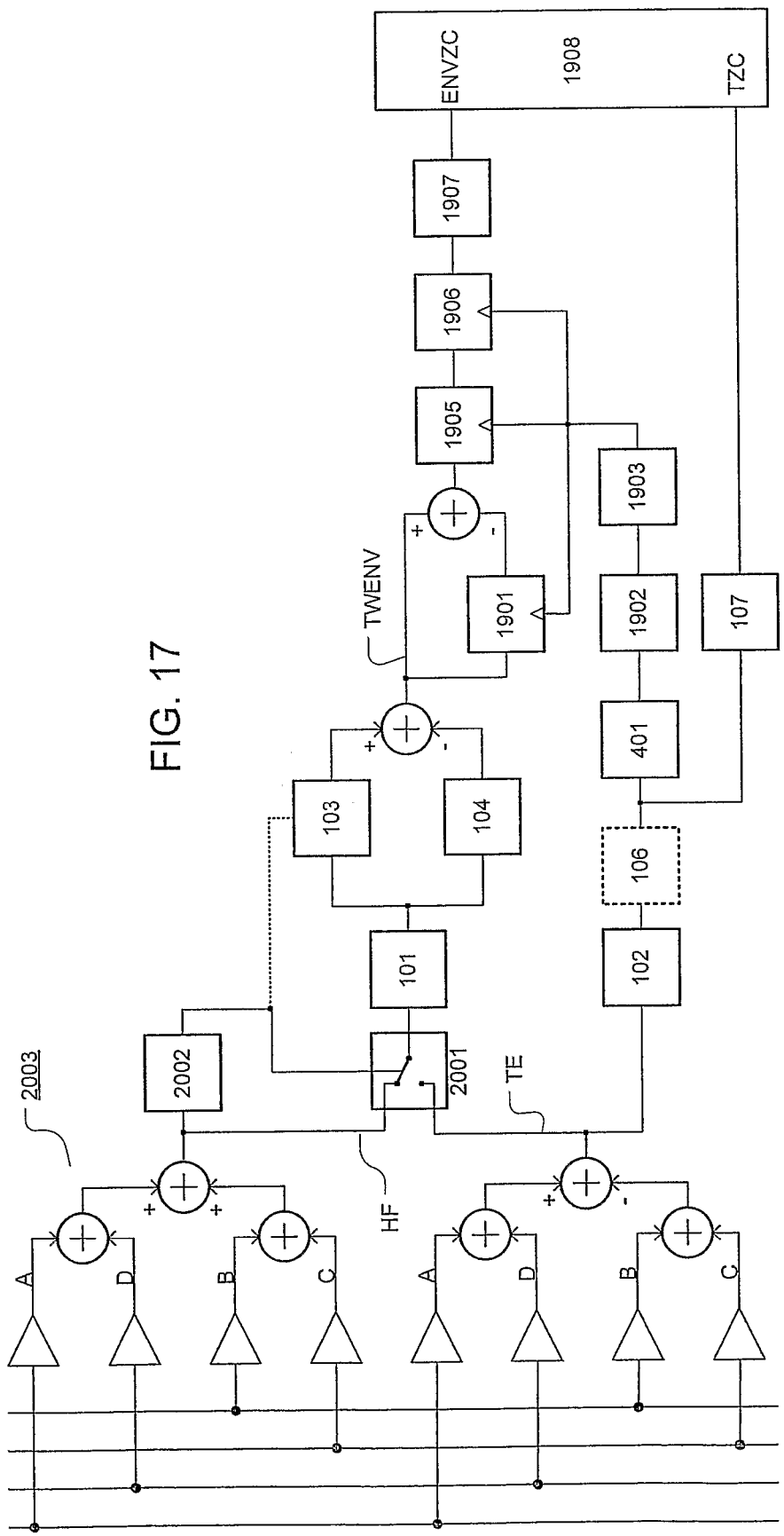
Figure 18:
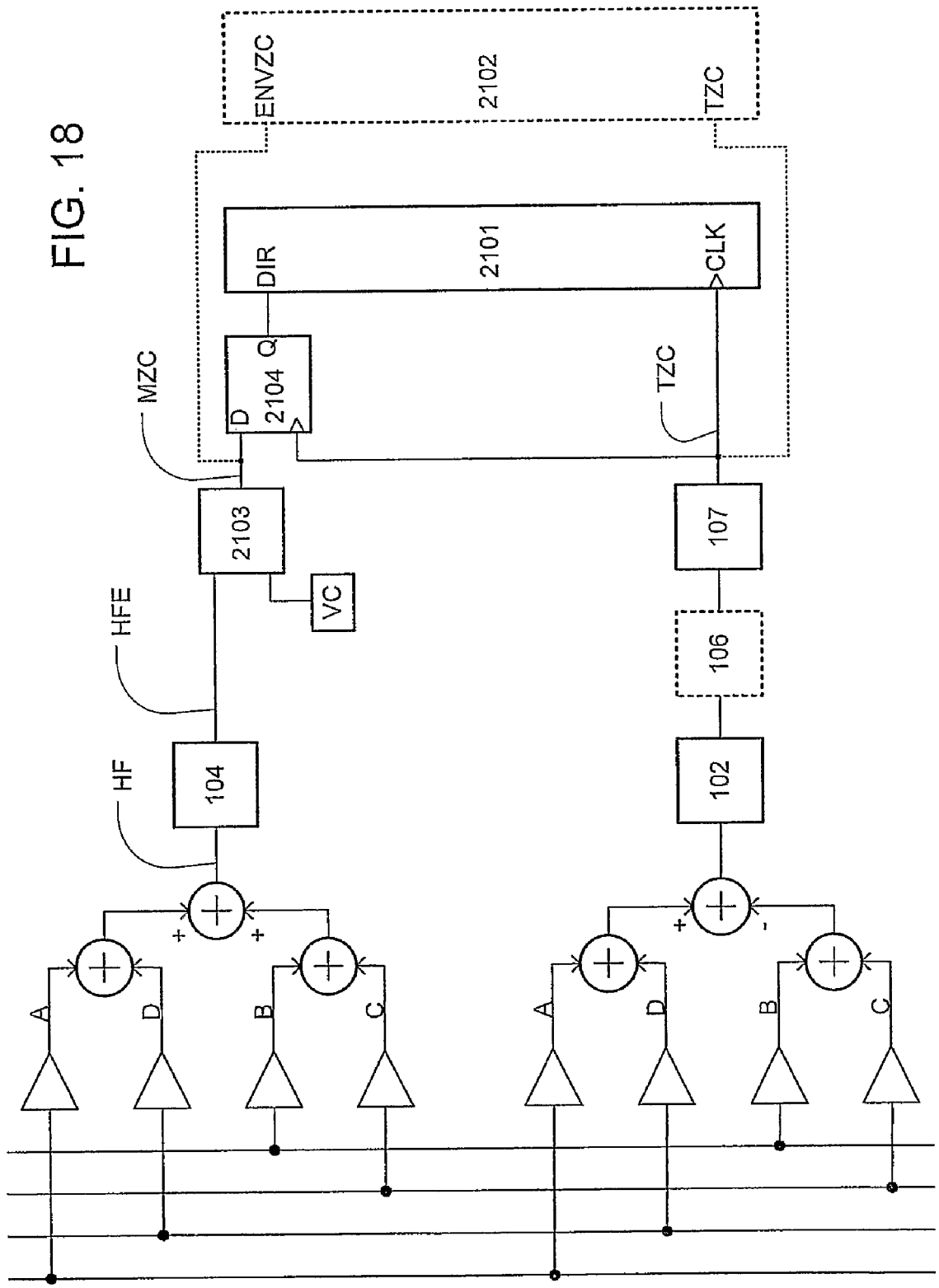

FIG. 3B shows the block diagram of a variant of the third exemplary embodiment, FIG. 4A shows the block diagram of a fourth exemplary embodiment, FIG. 4B shows the block diagram of a variant of the fourth exemplary embodiment, FIG. 5A shows the block diagram of a fifth exemplary embodiment, FIG. 5B shows the block diagram of a variant of the fifth exemplary embodiment, FIG. 6 shows signal diagrams of a method of the prior art for generating a mirror zero cross signal, FIG. 7 shows a state diagram, FIG. 8 shows signal diagrams with respect to the exemplary embodiment of FIG. 1, FIG. 9 shows signal diagrams with respect to the exemplary embodiment of FIG. 2, FIG. 10 shows signal diagrams with respect to the exemplary embodiments of FIGS. 3A and 3B, FIG. 11 shows signal diagrams with respect to the exemplary embodiments of FIGS. 4A and 4B, FIG. 12 shows signal diagrams with respect to the exemplary embodiments of FIGS. 5A and 5B, FIG. 13 shows signal diagrams with respect to a sixth exemplary embodiment, FIG. 14 shows a block diagram of the exemplary embodiment with respect to FIG. 13, FIG. 15 shows signal diagrams with respect to a seventh exemplary embodiment, FIG. 16 shows a block diagram of the exemplary embodiment with respect to FIG. 15, FIG. 17 shows a block diagram of a further embodiment, FIG. 18 shows a block diagram of an arrangement of the prior art for generating a mirror zero cross signal.

FIG. 1 shows that the wobble signal TW is obtained by evaluating the high-frequency component of the track error signal TE. The track error signal TE, for its part, is formed generally by combining the output signals of a photodetector in such a way that the signals of the left-hand half of the detector and the signals of the right-hand half of the detector are subtracted from one another. The photodetector 105 shown here has four light-sensitive areas 105A, 105B, 105C, 105D in order additionally to enable an astigmatism focus error signal to be formed. A photodetector having only two light-sensitive areas, which is divided into a left-hand half and a right-hand half, would be sufficient for obtaining the wobble signal TW. In the case of the four-area photodetector 105 depicted in FIG. 1, this is effected by the addition of the signals corresponding to the areas 105A and 105D, and 105B and 105C.

The resulting frequency of the wobble signal TW obtained from the wobbled tracks should have a value that is at a sufficiently high level above the interference signal spectrum of the track regulation. The wobble frequency advantageously lies above 300 kHz, so that the interference signal spectrum of the tracking control can be suppressed by means of suitable filter measures. Furthermore, the modulation of the wobbled tracks should at least have a magnitude such that the quotient of wobble amplitude when the track regulator is activated divided by track error amplitude in the event of track crossings has the value 0.15. These criteria are fulfilled for example in the case of storage media corresponding to the DVD+R/RW standard.

The simplest exemplary embodiment according to the invention as shown in FIG. 1 evaluates the high-frequency component and the low-frequency signal component of the track error signal TE separately. The high-frequency component of the track error signal is largely caused by the wobble of the tracks. In the lower signal path for the low-frequency signal component, the track error signal TE firstly passes through a low-pass filter 102 and is subsequently binarized by a comparator 107, as a result of which the signal TZC is generated. In order to suppress disturbing DC offsets, an AC coupling 106 may advantageously be effected upstream of the comparator 107.

The wobble signal TW is separated from the track error signal TE by means of a high-pass filter 101. The upper and lower envelopes of the output signal of the high-pass filter are determined by means of two envelope detectors 103, 104, and the difference between the two envelopes, which is determined in a subtractor 108, represents the instantaneous amplitude TWENV of the wobble signal TW.

The instantaneous amplitude TWENV is maximal in the track center and minimal in the region between two tracks. It is binarized by means of a comparator 109, thus giving rise to a signal ENVZC which, relative to the track error signal, has phase relationships comparable to those of the MZC signal. A D-type flip-flop 110 makes it possible to generate a direction signal DIR from the signals TZC and ENVZC, which direction signal can be used for direction-dependent track counting with an up-down counter 111. As an alternative, the signals TZC and ENVZC may be evaluated by means of a state logic 112 in accordance with the state diagram of FIG. 7.

FIG. 8 shows by way of example a signal diagram for the exemplary embodiment of FIG. 1. The part designated by 8A schematically shows the arrangement of grooves G and lands L across the scanning location x for an optical storage medium. All subsequent parts of the figure show signal profiles across the scanning location x. A relative movement of the scanning beam accordingly corresponds in the diagram to a reading of the depicted values from left to right or from right to left. This is identified by the arrows on the horizontal axes that are designated by "x" or "−x": the counting arrow designated by "x" corresponds to a movement toward the right, and the counting arrow designated by "−x" corresponds to a movement toward the left. For signal profiles which only occur in the event of a movement toward the left or right, only the counting arrow designated by "−x" or "x" is specified for identification. The same mode of representation holds true for all subsequent figures with signal profiles.

Part 8B shows the track error signal TE downstream of the low-pass filter. The envelope of the wobble signal TW illustrated underneath in part 8C exhibits an amplitude maximum at each center of the groove G and an amplitude minimum at center of the land L. Part 8D shows the AC-coupled output signal of the subtractor TWENV. Parts 8E and 8F show the two binarized signals TZC and ENVZC. The edges of the signal TZC are shifted by −90° with respect to MZC in the event of a movement toward the right, or shifted by +90° in the event of a movement toward the left.

FIG. 2 shows an alternative exemplary embodiment, which uses an up-down counter 204 and has a doubled resolution during track counting in comparison with the exemplary embodiment of FIG. 1. The first blocks of the respective signal paths correspond to those of FIG. 1. The instantaneous amplitude value of the wobble signal TWENV is rectified by means of a synchronous rectifier 201, the first input of which is connected to the output signal TWENV of the subtractor 205 and the second input of which is connected to the track zero cross signal TZC. The rectified amplitude values are sampled by means of a sample&hold block 202, which is controlled upon positive and negative edges of the signal TZC. An edge detector 206 is provided for this purpose, which generates a pulse whenever the signal TZC has an edge. The output signal ADIR of the S&H block 202 is binarized by means of a comparator 203 and indicates the movement direction DIR of the scanning beam, while the output of the edge detector 206 is used as counting pulse for the up-down counter 204.

FIG. 9 shows the signal diagrams associated with FIG. 2 and illustrates the function of the synchronous rectifier 201, of the edge detector 206 and of the S&H block 202. The signals designated by 9A to 9E correspond to the signals designated by 8A to 8E in FIG. 8. 9F designates the output signal SRENV of the synchronous rectifier 201. Its input signal TWENV is left unchanged if TZC is "high" and is in each case inverted if TZC is "low". The position of the S&H control pulses PLSTZC that are generated by the edge detector and designated by 9G or 9H differs in accordance with the movement direction.

If the scanning beam moves from left to right, in accordance with the signal profile designated by 9G, then the sample pulses occur in each case before the signal SRENV makes a jump upward. The signal SRENV designated by 9F is in each case sampled at the positions identified by arrows and held until the next edge of TZC. The corresponding output signal of the S&H block ADIR is designated by 9I and assumes negative values −V corresponding to "low" for a movement from left to right. The arrows at the top of the signal profile designated by 9F correspondingly indicate the sampling positions of the S&H block 202 in the event of a relative movement from right to left. Accordingly, the output signal ADIR—designated by 9J here—of the S&H block 202 will assume positive values +V corresponding to "high". The values of +V and −V, respectively, depend on the amplitude of the signal TWENV and thus on the difference between the two envelopes of the wobble signal TW. A signal DIR can be obtained from the signal ADIR by means of a comparator 203. The track counter 204 is incremented or decremented with each pulse of the signal PLSTZC in accordance with the direction specified by DIR.

FIG. 3 shows two variants 3A and 3B of an exemplary embodiment with an improved arrangement for evaluating the amplitude variation of the wobble signal for forming the direction signal DIR. Particularly in the case of DVD+R/RW media, the amplitude of the wobble signal is relatively small and the difference between the amplitudes on groove and land is likewise very small. In comparison with FIG. 2, the synchronous rectifier 301 has connected downstream of it a further S&H block 302 and also a subtractor 309, which determines the envelope difference in the synchronous-rectified signal TWENV between two pulses of PLSTZC.

FIG. 3B shows a variant in which a comparator 306 is directly connected downstream of the subtractor 309, the output signal of said comparator being sampled by a D-type flip-flop 307. The output of the D-type flip-flop 307 then forms the direction signal DIR.

FIG. 10 shows the signal diagrams associated with FIG. 3A. As can be seen, a possible offset in the signal TWENV designated by 10D or a variation of the envelopes of the wobble signal TW designated by 10C does not influence the direction identification. This is achieved in that the first S&H block 302, on each edge of the TZC signal, takes a sample of the synchronous-rectified signal SRENV designated by 10F and then the difference between instantaneous value and sample is formed within the interval until the next edge of the TZC signal, which results in a signal S/H1 shown in the signal profiles designated by 10G and 10H for the two movement directions. It is evident that at the instant of sampling, the difference at the output of the subtractor is zero and the voltage profile 10H that then forms changes toward negative values for a movement toward the right, while it assumes positive values in the event of a movement toward the left in accordance with 10G. Upon occurrence of the respective next edge of the TZC signal, in a manner controlled by the sampling pulses PLSTZC designated by 10I and 10J, respectively, the final value of these voltage profiles is sampled by the second S&H block 304 and held until the next sampling pulse.

The sampled signal ADIR is illustrated in a manner designated by 10K or 10L depending on the movement direction. A direction signal DIR can be determined in a simple manner from the polarity of the voltage (+V or −V) by means of a comparator. The two signals DIR and PLSTZC can be used to control an up-down counter 308, as illustrated in FIG. 3A.

Parts 11A to 11N of FIG. 10 show the voltage profiles associated with FIG. 3B; in this case, 11A to 11J correspond to 10A to 10J. The voltage profiles designated by 11G and 11H, respectively, are present at the input of the comparator 306. Since the voltage profiles in the example depicted have positive or negative values, depending on the movement direction of the scanning beam, upon the occurrence of the pulses PLSTZC designated by 11I and 11J, the output of the comparator 306 at these positions is "low" for a movement toward the right and "high" for a movement toward the left. The acceptance points of the binary output signal of the comparator 306 by the D-type flip-flop 307 are indicated by vertical arrows in the signal profiles designated by 11M and 11N. The output of the D-type flip-flop 307 then permits a statement about the movement direction of the scanning beam and may be fed as direction signal DIR to the up-down counter 308.

FIGS. 4A and 4B show two further variants of an exemplary embodiment according to the invention. What is new here is the introduction of a 90° phase shifter 401 and an integrator 402. The advantage with the use of an integrator 402 is that instantaneous disturbances that may be superposed on the wobble signal TW and influence the envelope TWENV thereof are averaged out by the integration over a half-cycle of the track error signal. The function of the two new blocks 401, 402 is explained below with reference to the signal profiles shown in FIG. 11. The phase shifter 401 converts the track error signal TE into a signal TE1 delayed by 90°, which is used for forming a product with the envelope difference TWENV.

FIG. 4B shows a variant of the exemplary embodiment in which, analogously to in FIG. 3B, a comparator 403 and a D-type flip-flop 404 are connected downstream of the integrator 402.

FIG. 11 shows the voltage profiles associated with FIG. 4A. The signals designated by 12E and 12F, respectively, have a phase shift by 90° with respect to the track error signal TE 12B. Since the diagram is to be read from right to left for a movement direction toward the left, a temporal phase shift of the signal TE in this case corresponds to a signal profile TE1 12F shifted by 90° toward the left. The product TEMENV of the envelope difference TWENV and the phase-shifted track error signal is illustrated in the parts designated by 12F and 12G for the two movement directions. The integrator 402 downstream of the analog multiplier 405 has the special feature of a reset input by which it can be reset to an initial value of zero. The reset function is triggered by pulsed output signals of an edge detector 406, the pulses of which are generated upon signal edges of the phase-shifted track error signal TE1. The pulses PLSTZC are designated by 12J and 12K. The resulting output signal INT of the integrator 402 exhibits the behavior designated by 12H or 12I, depending on the movement direction. With each falling edge of the reset pulse, the integrator 402 is reset and begins a new integration cycle. The profile of the integration is determined by the sign and the value of the area integrals of the signals TEMENV shown in 12F and 12G, respectively. Before the integrator 402 is reset, the integration value is sampled by an S&H block 407. The sampling takes place upon a rising edge of the pulse signal PLSTZC. The sampled values S/H1 are illustrated as parts 12L and 12M. The sampling positions are indicated by vertical arrows. The polarity of the sampled signals is evaluated by means of a comparator 408 and produces the direction signal DIR.

Parts 13A to 13O of FIG. 11 show the voltage profiles of the variant shown in FIG. 4B; In this case, 13A to 13K correspond to 12A to 12K. The output signal of the comparator 403 is sampled by the D-type flip-flop 404 upon rising edges of the pulse signal PLSTZC and may be used as direction signal DIR for an up-down counter 409.

FIGS. 5A and 5B show a further exemplary embodiment. In contrast to the block 410 in FIGS. 4A and 4B, here a comparator 501, which binarizes the phase-shifted track error signal, is arranged upstream of the input of the multiplier 502. Accordingly, as in FIGS. 3A and 3B, the latter has the function of a synchronous rectifier, which in practice can be realized more simply than the analog multiplier 405 from FIG. 4.

FIG. 12 shows the voltage profiles with respect to FIG. 5A in its parts designated by 14A to 14P, and also the voltage profiles with respect to FIG. 5B in the parts designated by 15A to 15R. The signal names used correspond to those in the figures already described above. The AC-coupled envelope difference signal TWENV shown in part 14D of the figure is either switched through by the synchronous rectifier 502 if the output signal TZC1 of the comparator 501 that is shown in part 14F and 14H, respectively, is "high", or else inverted if TZC1 is "low".

FIG. 14 shows a further, particularly advantageous exemplary embodiment that combines the advantageous properties of the abovementioned exemplary embodiments. An identification of the movement direction is possible despite disturbances, offsets or amplitude variations possibly occurring in the wobble signal TW. This is achieved by the use of two S&H blocks 1701, 1702 and also a resettable integrator 1703. The signal TWENV is converted into a signal SRENV by the synchronous rectifier 502. The synchronous rectifier 502 is controlled by the track crossing signal TZC1 shifted by 90°. The output signal SRENV of the synchronous rectifier 502 is sampled by a first S&H block 1701, which, for its part, is controlled by sampling pulses PLSTZC.

The instantaneous value of the signal SRENV and the held sample during the interval between two edges of the signal PLSTZC are subtracted from one another by a subtractor 1704, which results in a signal S/H1. An integrator 1703 connected downstream of the subtractor integrates this signal in each case for a sampling interval between two pulses of PLSTZC. Despite disturbances possibly present in the wobble signal, the final value of the integration unambiguously indicates the relative movement direction by means of its polarity. The final value of the integration is sampled by a second S&H block 1702 controlled by PLSTZC pulses. A comparator 1705 identifies the polarity of the sampled signals and forms the signal DIR, which is used for controlling an up-down counter 409 for track counting. The variant with a D-type flip-flop shown in the previous exemplary embodiments is likewise possible here, but is not illustrated.

FIG. 13 shows the signal diagrams associated with FIG. 14. Part 16C again shows a wobble signal TW having in this case both a DC offset and variations of the envelope amplitude. The resulting envelope difference TWENV shown in part 16D represents this. Parts 16I and 16J show the signal SRENV in the case of the two movement directions, and parts 16F and 16H show the respectively associated track crossing signal TZC1 shifted by 90°. Parts 16M and 16N of the figure show the sampling pulses PLSTZC that control the first S&H block, and parts 16K and 16L show the signal S/H1. It can be seen from parts 16K and 16L that, at the instant of sampling, the difference at the output of the subtractor is zero and the voltage profile that then forms exhibits negative half-cycles in the case of the movement toward the right as shown by way of example in 16K, while it exhibits positive half-cycles in the case of the movement toward the left assumed in 16L. The integrator 1703 integrates the areas hatched in gray in parts 16K and 16L, and parts 160 and 16P show the voltage profile at the output of the integrator 1703. Parts 16Q and 16R of the figure show the values sampled by the second S&H block 1702 controlled by PLSTZC pulses.

FIG. 16 shows the block diagram of a further exemplary embodiment. The envelope difference TWENV of the wobble signal TW, on which disturbances, DC offset and amplitude variations are superposed, is sampled by a first S&H block 1901, the sampling instants being defined by the signal PLSTZC, which is again derived from a track error signal TE1 phase-shifted by 90° by means of a comparator 1902, 1903. The instantaneous value of the signal TWENV and the held sample during the interval between two edges of the signal PLSTZC are subtracted from one another by means of a subtractor 1904. Since no synchronous rectifier is provided in this exemplary embodiment, the half-cycles at the output of the subtractor 1904 may have positive or negative polarity. In accordance with the relative movement, however, the half-cycles in each case start with the value zero, since sample and instantaneous value are identical at the sample instant. An integrator 1905 connected downstream of the subtractor integrates the difference between the last sample of TWENV and its instantaneous value in each case for a sampling interval between two pulses of PLSTZC. The integrator 1905 has a reset input that ensures that each integration begins with the value zero. A second S&H block 1906 in each case samples the final value of the integration before a new integration is started. The signal sampled by the second S&H block 1906 accordingly indicates the area and polarity of the signal at the output of the subtractor 1904 for each interval between the occurrence of two pulses PLSTZC. The downstream comparator 1907 binarizes the integrator signal, thereby forming a signal ENVZC having a phase shift of +90° or −90° with respect to the TZC signal. As already explained above with respect to the prior art, the signals TZC and ENVZC are particularly advantageously evaluated by a state logic in accordance with FIG. 7.

FIG. 15 shows the abovementioned signals of the exemplary embodiment from FIG. 16. Part 18B shows the track error signal TE. Parts 18I and 18J illustrate the signal S/H1 at the output of the subtractor 1904 for the two movement directions, which signal is formed by sampling and difference formation from the envelope difference signal TWENV shown in 18D. The sampling is controlled by signal PLSTZC, which is formed by an edge detector 1903 and has pulses in each case on the edges of the signal TZC1 delayed by 90°. PLSTZC also controls the resetting of the integrator 1905, the output signal INT of which is sampled by the second S&H block 1906 at the positions identified by arrows, thus resulting in the signal S/H2 shown in parts 180 and 18P. The signal ENVZC shown in part 18Q is formed by binarization by means of a comparator 1907. ENVZC has a phase shift of +90° or −90°, dependent on the relative movement of the scanning beam, with respect to the signal TZC shown in part 18R, which is formed by binarization from the track error signal TE.

FIG. 17 shows an arrangement by means of which the blocks described in the previous block diagrams can also be used for forming the MZC signal from the data signal HF on regions of the optical storage medium that have already been written to. For this purpose, a switch 2001 is connected upstream of the envelope detector 101, 103, 104 and is used to select the track error signal TE or the data signal HF for high-pass filtering and subsequent processing. The selection is effected for example by means of an HF detector 2002, which controls the changeover contact of the switch 2001. In the event of a data signal HF being present, it is used for track counting. Otherwise, the track error signal is selected and the wobble signal is generated therefrom in order to enable direction-dependent counting on non-prerecorded regions. The upper envelope detector 103 may optionally be switched off during the selection of the data signal HF.

For obtaining the MZC signal from the data signal HF as well, the detection in accordance with the exemplary embodi-

The invention claimed is:

1. A method for driving a track counting device in a scanning unit for optical recording media in which data are stored in tracks and the position of the tracks transversely with respect to the track direction is modulated in a manner dependent on the position along the track in a predetermined manner, the scanning unit focusing a scanning beam onto the recording medium and evaluating the scanning beam reflected from the recording medium by means of a plurality of photodetector segments arranged adjacent, and deriving a track error signal from the difference between the signals of the left-hand photodetector segments in the track direction and the signals of the right-hand photodetector segments in the track direction; comprising the steps of:
determining a wobble signal from the difference between a lower and an upper envelope of a track error signal that has been high-pass-filtered with a first cutoff frequency;
determining a track zero crossing signal from a track error signal that has been low-pass-filtered with a second cutoff frequency;
jointly evaluating the wobble signal and the track zero crossing signal in such a away as to ascertain whether, in the event of the sign changes of one signal, the respective other signal has positive or negative values;
determining, from the result of the joint evaluation, drive signals that are used to drive a sequential logic for track counting.

2. The method as claimed in claim 1, the joint evaluation containing a sample and hold of a signal determined by product formation from the wobble signal and the track zero crossing signal.

3. The method as claimed in claim 1, the determination of the track zero crossing signal containing a phase shift, and the joint evaluation containing a temporal integration of a product of the wobble signal and the track zero crossing signal.

4. The method as claimed in claim 1, a clock signal and a direction signal being determined as drive signals.

5. The method as claimed in claim 1, a first signal, which changes its value precisely when the scanning beam crosses the center of a track, and a second signal, which changes its value precisely when the scanning beam crosses the boundary between two adjacent tracks, being determined as drive signals.

6. A device for determining drive signals for driving a track counting device in a scanning unit for optical recording media in which data are stored in tracks and the position of the tracks transversely with respect to the track direction is modulated in a manner dependent on the position along the track in a predetermined manner, the scanning unit focusing a scanning beam onto the recording medium and evaluating the scanning beam reflected from the recording medium by means of a plurality of photodetector segments arranged adjacent, and deriving a track error signal from the difference between the signals of the left-hand photodetector segments in the track direction and the signals of the right-hand photodetector segments in the track direction; comprising:
high-pass filter means with a first cutoff frequency, at the input of which the track error signal is present, and the output signal of which is fed in parallel to envelope rectifying means for the upper and lower envelope;
difference forming means, to which the output signals of the upper and lower envelope rectifying means are fed;
low-pass filter means with a second cutoff frequency, at the input of which the track error signal is present;
evaluation means, the input signals of which are formed from the output signals of the difference forming means and the low-pass filter means, set up such that evaluation is continuously effected to ascertain whether, in the event of the sign changes of one input signal, the respective other input signal has positive or negative values, and that the drive signals are provided.

7. The device as claimed in claim 6, the evaluation means containing product forming means, to which the output signals of the difference forming means and the low-pass filter means are fed, and sample and hold means, to which the output signal of the product forming means is fed.

8. The device as claimed in claim 6, the low-pass filter means containing phase shift means, and the evaluation means containing product forming means, to which the output signals of the difference forming means and the low-pass filter means are fed, and integration means, to which the output signal of the product forming means is fed.

9. The device as claimed in claim 6, which additionally contains data signal forming means, HF detection means and changeover means controlled by the output signal of the HF detection means, the data signal forming means forming a data signal from the sum of the signals of the photodetectors, the HF detection means detecting whether a usable data signal corresponding to a written-to region of the recording medium is present, and the changeover means, when a usable data signal is present, changing over the input of the high-pass filter means to the data signal.

10. The device as claimed in claim 9, the envelope rectifying means for the upper envelope being deactivated when a usable data signal is present.

11. The method as claimed in claim 1, the determination of the track zero crossing signal containing a high-pass filtering with a third cutoff frequency below the second cutoff frequency.

* * * * *